United States Patent
Kuo et al.

(10) Patent No.: US 11,041,778 B1
(45) Date of Patent: Jun. 22, 2021

(54) CONFIGURABLE LEAK DETECTION SYSTEM

(71) Applicant: Cooler Master Co., Ltd., New Taipei (TW)

(72) Inventors: Chu yi Kuo, New Taipei (TW); Wen hong Chen, New Taipei (TW); Chun hsien Chen, New Taipei (TW)

(73) Assignee: COOLER MASTER CO., LTD., New Taipei (TW)

( * ) Notice: Subject to any disclaimer, the term of this patent is extended or adjusted under 35 U.S.C. 154(b) by 0 days.

(21) Appl. No.: 16/917,945

(22) Filed: Jul. 1, 2020

(51) Int. Cl.
G08B 21/20 (2006.01)
G01M 3/18 (2006.01)
G08B 7/06 (2006.01)

(52) U.S. Cl.
CPC ............... *G01M 3/188* (2013.01); *G08B 7/06* (2013.01); *G08B 21/20* (2013.01)

(58) Field of Classification Search
CPC ..................................... G08B 1/00; G05B 1/00
See application file for complete search history.

(56) References Cited

U.S. PATENT DOCUMENTS 5,934,830 A * 8/1999 Bouvier ................. B65D 90/51
405/54

* cited by examiner

*Primary Examiner* — Shirley Lu

(57) ABSTRACT

A configurable leak detection system comprising a leak detection device and at least a leak detection covering comprising a leak detection region having a first and second electrode and at least an attachable region is provided. The first and second electrodes are disposed spaced apart and fixed in firm contact with the covering. The system is attached onto liquid cooling systems, bases, and/or fluid conduits. When liquid is leaked onto the covering, the liquid is absorbed therein, until the dampened region extends over some point on each of the first and second electrodes. An electrical current is conducted, providing a low resistance path therebetween. An impedance change is detected, an alert means is generated, and the leak detection device is reset. More than one configurable leak detection system is attached onto systems, bases and/or fluid conduits via the at least an attachable region, and then electrically coupled together.

20 Claims, 16 Drawing Sheets

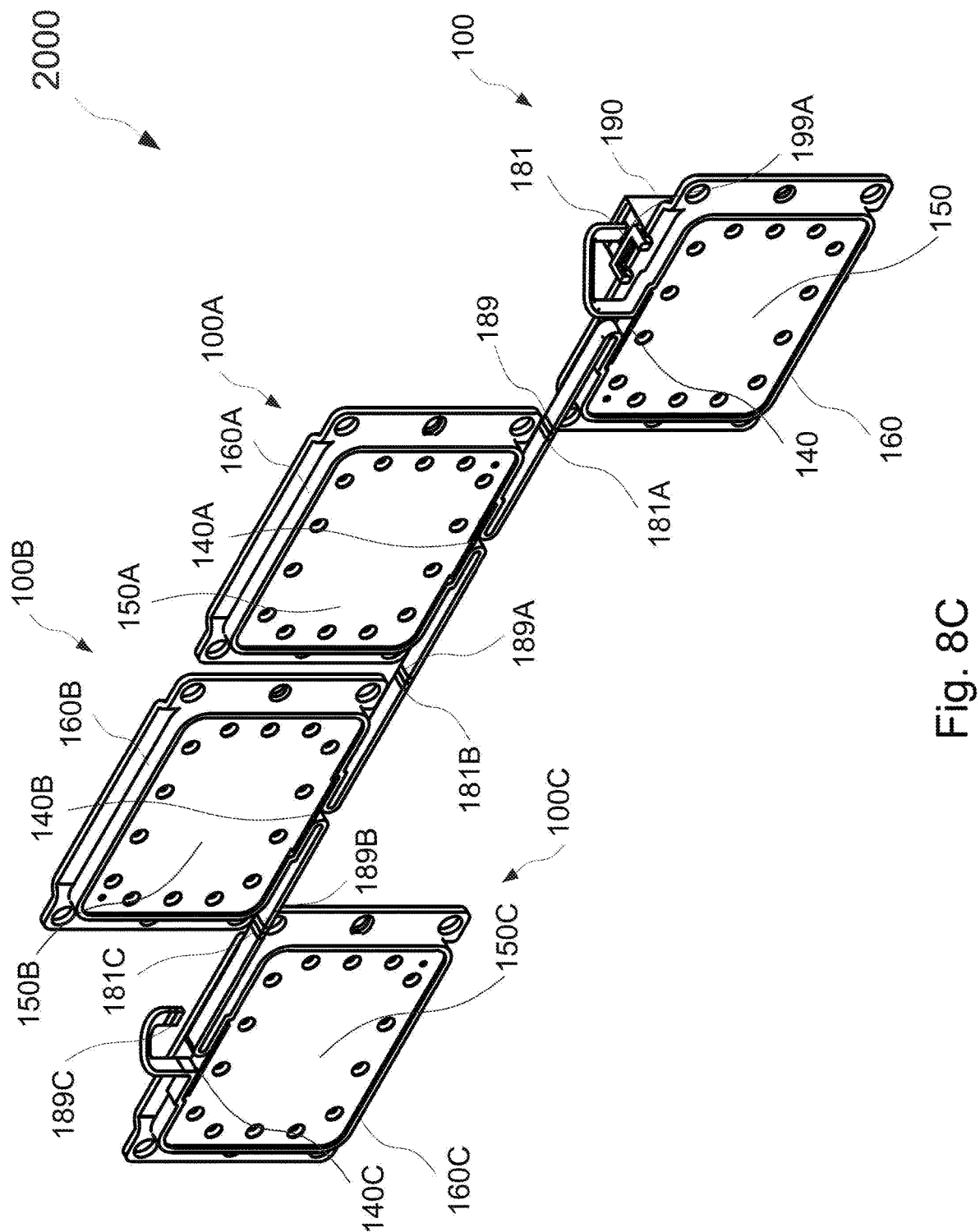

CONFIGURABLE LEAK DETECTION SYSTEM

TECHNICAL FIELD

Example embodiments relate generally to the field of interelectrode resistance detection and, more particularly, to configurable leak detection systems using interelectrode resistance detection.

BACKGROUND

During operation of computers, servers, and like-sized or smaller electric and electronic elements, modules, devices and systems, individually or in combination in racks, the heat generated thereby, for example, by CPUs, processing units, graphic boards, or computational modules, must be dissipated quickly and efficiently to keep operating temperature within manufacturer recommended ranges, under, at times, challenging operating conditions. As these elements, modules, devices and systems increase in functionality and applicability, so does the power requirements thereof and this in turn increases cooling requirements.

Several techniques have been developed for extracting heat from computers, servers, and like-sized or smaller electric and electronic elements, modules, devices and systems, individually or in combination in racks. One such technique is a closed-loop liquid-cooling system, wherein a heat exchanger is in thermal contact with the elements, modules, devices and/or systems, transporting heat away therefrom, and then cooling fluid, circulating inside of a cooling loop system incorporating the heat exchanger, flows over the heat exchanger by a pumping unit, removing heat therefrom. Heat is transferred from the heat source to the heat exchanger, the heat exchanger to the cooling fluid, and the cooling fluid to the environment via a radiator and/or additional heat exchanger.

Generally, a maximum operating temperature of electric and/or electronic elements, modules, devices and systems is defined and an appropriate liquid-cooling system dependent on a heat exchanger, radiator and/or additional heat exchanger, and pump efficiency is provided. Often, more than one electric and/or electronic elements, modules, devices and/or systems require cooling, whereby, multiple tubing and pressure-tight fittings are required. As the amount of tubing and fittings increase, so does the risk for damage and failure due to leakage.

When leakage detection is required, a leakage detection system may be employed. Some leakage detection systems may provide a method for detection against large leakage volumes, but not smaller leaks. Some methods for leakage detection may notify a user of leakage, but not a specific region of leakage. Some leakage detection systems may be assembled to a single region or electric or electronic element, module, device or system, but not to multiple regions or multiple electric or electronic elements, modules, devices or systems. Installation of some leakage detection systems may require a lengthy installation time. Installation of some leakage detection systems may require alterations, such as cutting, for manual placement and assembly.

SUMMARY

In an embodiment, a configurable leak detection system, detecting leakage from at least a vessel having pressurized fluid therein, comprising at least a leak detection covering and a leak detection device is provided. The at least a leak detection covering comprises a leak detection region and at least an attachable region. The leak detection region includes a first insulating material layer having a first inner surface and a first outer surface, a first electrode, fixedly disposed on the first inner surface, and a second electrode, fixedly disposed on the first inner surface, corresponding to the first electrode and spaced apart therefrom by a gap. The proximal ends of the first and second electrodes form a coupling end of the at least a leak detection covering, and distal ends opposite the proximal ends of the first and second electrodes form a configuration end of the at least a leak detection covering. The at least an attachable region includes an attachable material, attached to the leak detection region, configured such that the at least a leak detection covering is fastened to the vessel. The leak detection device has electrical circuitry, an input device end, an output device end, and an alert means. The input device end, output device end and alert means are electrically coupled to the electrical circuitry, and the coupling end of the at least a leak detection covering is electrically coupled to the input device end, wherein the leak detection device is configured to detect impedance changes between the first and second electrodes, whereby when impedance changes are detected, an alert is generated.

In some embodiments, the leak detection region of the at least a leak detection covering further comprises a second insulating material layer opposed to the first insulating material layer, having a second inner surface and a second outer surface. The second inner surface is fixed to and in firm contact with the first and second electrodes and the first outer surface, whereby the first and second electrodes are fixedly disposed between the first and second insulating material layers.

In some embodiments, the attachable material is a stretchable material attached to the leak detection region, configured such that the at least a leak detection covering is slip-on fastened to the vessel. In some embodiments, the at least a leak detection covering is turned inside out or outside in to rotate the surfaces of the first insulating material or second insulating material in contact with the vessel.

In some embodiments, the attachable material is at least one of a button, toggle, zipper, Velcro, or fabric ties or laces, or any combination of the foregoing.

In some embodiments, the shape of the at least a leak detection covering is a single plane surface shape and a pattern of the corresponding first and second electrodes comprises at least a change of direction. In some embodiments, the single plane surface shape of the at least a leak detection covering is T-shaped, and the amount of the at least an attachable region is two or greater.

In some embodiments, the amount of the at least a leak detection covering is two or greater, and the two or greater at least a leak detection coverings are electrically coupled via configuration and coupling ends thereof, respectively. In some embodiments, the shape of the at least a leak detection covering is at least one of a single plane surface shape, multiple plane surface shape, or curved surface shape, or any combination of the foregoing, and a pattern of the corresponding first and second electrodes comprises at least a change of direction or no change of direction.

In some embodiments, the first and second insulating material layers are made from hydrophilic and electrically non-conductive material, respectively. In some embodiments, the first and second insulating material layers are made of at least one of a plastic microfiber material, or natural cellulose fiber material, or any combination of the foregoing, respectively. In some embodiments the first and second insulating material layers are impregnated with an aqueous-soluble salt, increasing electrical conductivity thereof when liquid is leaked thereon, facilitating determination of leaking liquid impedance changes, respectively. In some embodiments, the first and second insulating material layers are made of a liquid responsive material, whereby the location of leaking liquid is visibly determinable, respectively.

In some embodiments, the shape of the first and second electrodes is at least one of wire shaped or flat strip shaped, or any combination of the foregoing. In some embodiments, the first and second electrodes are made of at least one of copper, aluminum or other conductive metal, or any combination of the foregoing. In some embodiments, the alert means is at least one a visual or audible alert means via corresponding visual or audible devices, or any combination of the foregoing.

BRIEF DESCRIPTION OF THE DRAWINGS

Unless specified otherwise, the accompanying drawings illustrate aspects of the innovative subject matter described herein. Referring to the drawings, wherein like reference numerals indicate similar parts throughout the several views, several examples of heat exchanger systems incorporating aspects of the presently disclosed principles are illustrated by way of example, and not by way of limitation.

FIG. 8C is a schematic perspective fifth view of multiple configurable leak detection systems of FIG. 1A assembled to multiple liquid cooling assembly bases of FIG. 4A, according to an example embodiment.

DETAILED DESCRIPTION

Figure 1A:
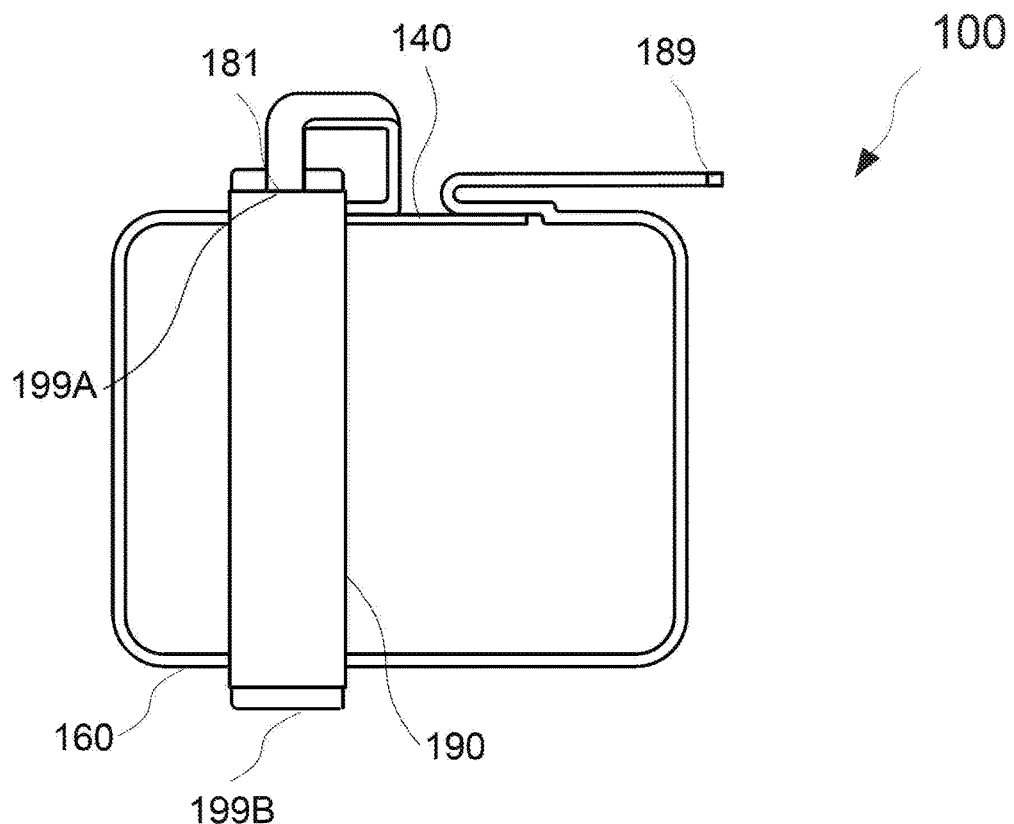
FIG. 1A is a schematic perspective first view of a configurable leak detection system, according to an example embodiment.

The following describes various principles related to liquid cooling systems by way of reference to specific examples of configurable leak detection systems and liquid cooling systems, bases, and/or fluid conduits, including specific arrangements and examples of main bodies and multiple pumps embodying innovative concepts. More particularly, but not exclusively, such innovative principles are described in relation to selected examples of liquid cooling systems, bases, and/or fluid conduits and well-known functions or constructions are not described in detail for purposes of succinctness and clarity. Nonetheless, one or more of the disclosed principles can be incorporated in various other embodiments of liquid cooling systems, bases, and/or fluid conduits to achieve any of a variety of desired outcomes, characteristics, and/or performance criteria.

Thus, liquid cooling systems, bases, and/or fluid conduits having attributes that are different from those specific examples discussed herein can embody one or more of the innovative principles, and can be used in applications not described herein in detail. Accordingly, embodiments of liquid cooling systems, bases, and/or fluid conduits not described herein in detail also fall within the scope of this disclosure, as will be appreciated by those of ordinary skill in the relevant art following a review of this disclosure.

Example embodiments as disclosed herein are directed to liquid cooling systems, bases, and/or fluid conduits and configurable leak detection systems, wherein a heat exchanger is in thermal contact with electric and/or electronic elements, modules, devices and/or systems, transporting heat away therefrom, and then cooling fluid, circulating inside of a closed-loop cooling system incorporating the heat exchanger via fluid conduits, flows over the heat exchanger by a mufti-pumping unit, removing heat therefrom. The heated cooling fluid is output from the multi-pumping unit and input to a radiator and/or another heat exchanger. Next, the heated cooling fluid flows to and through the radiator and/or another heat exchanger, whereby, the radiator and/or another heat exchanger may have a plurality of heat fins thereon for increased heat dissipation. Then the cooling fluid flows from the radiator and/or another heat exchanger to the multi-pumping unit to once again begin the cooling loop. Although the cooling loop includes a multi-pumping unit, more than one multi-pumping unit may be coupled to the radiator and/or another heat exchanger. In this manner, multiple heat generating devices and/or a larger heat generating region may be cooled. Each of the multi-pumping units may be adjacently configured in rows or differently, allowing for design flexibility enabling application-specific configurations.

The liquid cooling system may be configured within a chassis or as part of an electric or electronics system that includes heat generating devices to be cooled. The liquid cooling system includes at least one closed liquid-based cooling loop, and may further comprise one or more fans. The one or more fans may be coupled to the back end of the radiator and/or another heat exchanger via a fastener (e.g., bolts, screws, an adhesive material, etc.) at structural portions of the radiator and/or another heat exchanger, transporting air through the radiator and/or another heat exchanger to an air plenum or to an outside of the chassis or electric or electronics system. Those of ordinary skill in the relevant art may readily appreciate that the type and size of fans may be varied, as long as cooling fluid may be circulated through the radiator and/or another heat exchanger and air may be transferred through the radiator to an air plenum or to an outside of the chassis or electric or electronics system.

In an embodiment, a configurable leak detection system comprising a leak detection device and at least a leak detection covering is provided. The at least a leak detection covering comprises a leak detection region having a first and second electrode and at least an attachable region. The first and second electrodes are disposed spaced apart by a gap and fixed in firm contact with the covering. The system is attached onto liquid cooling systems, bases, and/or fluid conduits. When liquid is leaked onto the covering, the liquid is absorbed therein, until the dampened region extends over some point on each of the first and second electrodes. An electrical current is conducted, providing a low resistance path therebetween. An impedance change is detected, an alert means is generated, and the leak detection device is reset. More than one configurable leak detection system of different shapes and sizes are fastened to respective liquid cooling systems, bases, and/or fluid conduits via the at least an attachable region, without gathering or wrinkling, and then electrically coupled together.

Figure 1B:
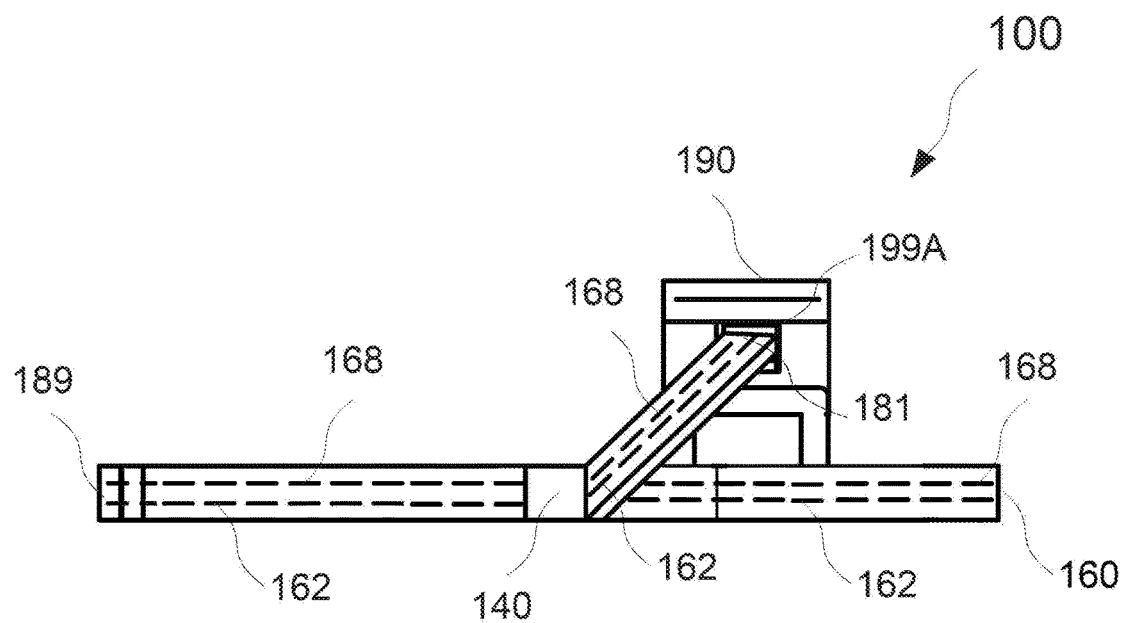
FIG. 1B is a schematic perspective fourth interior view of the configurable leak detection system of FIG. 1A, according to an example embodiment.
Figure 1C:
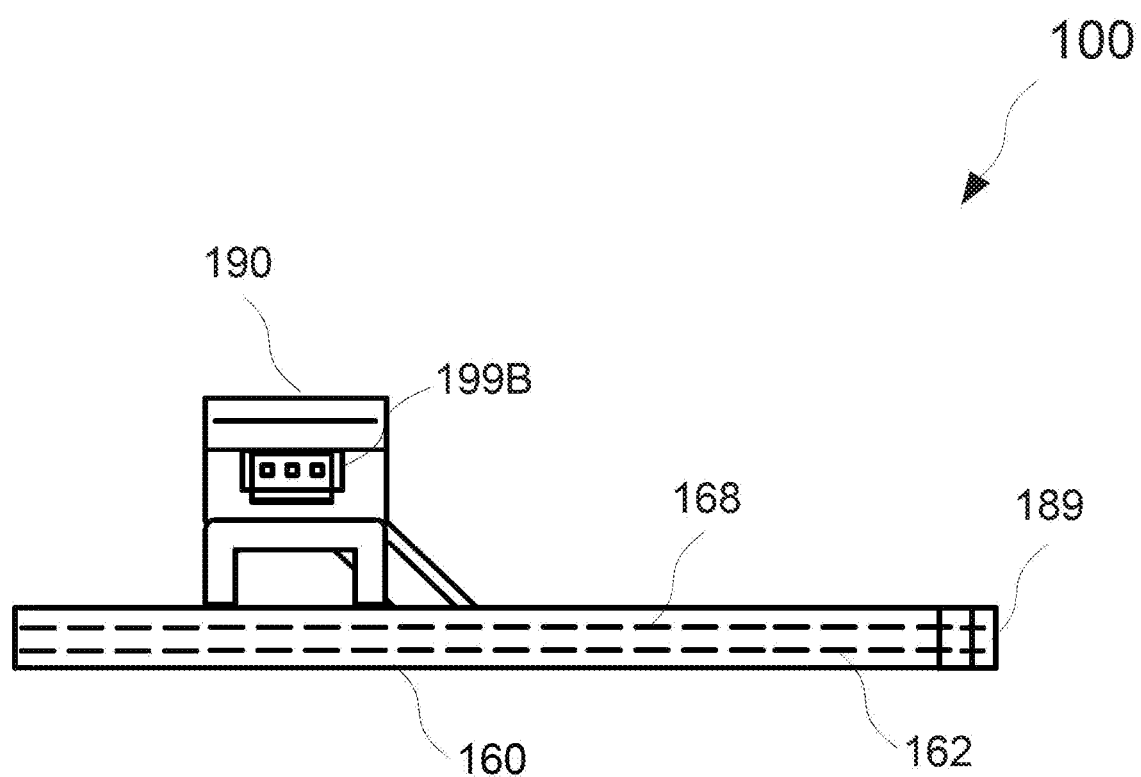
FIG. 1C is a schematic perspective second interior view of the configurable leak detection system of FIG. 1A, according to an example embodiment.

FIG. 1A is a schematic perspective first view of a configurable leak detection system, according to an example embodiment. FIG. 1B is a schematic perspective fourth interior view of the configurable leak detection system of FIG. 1A, according to an example embodiment. FIG. 1C is a schematic perspective second interior view of the configurable leak detection system of FIG. 1A, according to an example embodiment. The liquid cooling systems, bases, and/or fluid conduits having the configurable leak detection system of the embodiments may be employed to cool at least one of an element, module, device and/or system. Referring to FIGS. 1A to 1C, a configurable leak detection system 100, detecting leakage from at least a vessel having pressurized fluid therein, comprising a leak detection circuit or device 190 and at least a leak detection covering is provided. The at least a leak detection covering comprises a leak detection region 160 having a first electrode 162 and a second electrode 168, and an at least an attachable region 140.

Those having ordinary skill in the relevant art may readily appreciate that the vessel may comprise any one of a liquid cooling system, heat exchanger attached to a base, or fluid conduit, wherein a heat exchanger is in thermal contact with electric and/or electronic elements, modules, devices and/or systems, transporting heat away therefrom, and then cooling fluid, circulating inside of a closed-loop cooling system incorporating the heat exchanger via fluid conduits, flows over the heat exchanger by a multi-pumping unit, removing heat therefrom.

In some embodiments, the leak detection circuitry or device 190 is an electrically operated device having electrical circuitry known to those having ordinary skill in the relevant art that may detect impedance changes (i.e., reductions in resistance) resulting from the presence of water and/or other conductive liquids between the first electrode 162 and second electrode 168, as an example, and having an alert means. The leak detection circuitry or device 190 comprises an input circuitry or device end 199A end and an output circuitry or device end 199B. The input circuitry or device end 199A, output circuitry or device end 199B and alert means are electrically coupled to the electrical circuitry, and the coupling end 181 of the at least a leak detection covering is electrically coupled to the input circuitry or device end 199A, wherein the leak detection circuitry or device 190 is configured to detect impedance changes between the first and second electrodes 162, 168, whereby when impedance changes are detected, an alert is generated.

In some embodiments, the leak detection region 160 includes a first insulating material layer having a first inner surface and a first outer surface. In some embodiments, the leak detection region 160 further includes a second insulating material layer opposed to the first insulating material layer, having a second inner surface and a second outer surface, whereby the second inner surface is fixed to the first outer surface of the first insulating material layer. The at least an attachable region 140 includes an attachable material, attached to the leak detection region 160, configured such that the at least a leak detection covering may be fastened to the vessel.

The leak detection region 160 is sufficiently stiff and configured for easy attachment to liquid cooling systems, bases, and/or fluid conduits via the at least an attachable region 140, without gathering or wrinkling. The leak detection region 160 is sufficiently thin, such that the flow of small quantities, e.g., droplets, of water and/or conductive liquid is not impeded. The first inner surface of the first insulating material layer is the portion of the leak detection region 160 at least in partial contact with the liquid cooling systems, bases, and/or fluid conduits. In some embodiments, the second outer surface of the second insulating material layer is the portion of the leak detection region 160 opposite the first inner surface of the first insulating material layer.

In some embodiments, the first electrode 162 and second electrode 168 is parallel and fixedly disposed on the first inner surface of the first insulating material layer, whereby the second electrode 168 is spaced apart from the first electrode 162 by a gap. In some embodiments, the first electrode 162 and second electrode 168 is parallel disposed between the first and second insulating material layers and in firm contact therewith. In such a configuration, the second inner surface is fixed to and in firm contact with the first and second electrodes 162, 168 and the first outer surface, whereby the first and second electrodes 162, 168 are fixedly disposed between the first and second insulating material layers and spaced apart from one another by the gap. The gap may be a width of the first electrode 162 or second electrode 168, or greater, depending upon the sensitivity of the leak detection circuitry or device 190; however, the embodiments are not limited thereto. The distance of the gap may vary, and in certain regions, and/or may be smaller than a width of the first electrode 162 or second electrode 168 if required.

The proximal ends of the first electrode 162 and second electrode 168 of the at least a leak detection covering form a coupling end 181 and may be electrically coupled to the input circuitry or device end 199A and distal ends of the first electrode 162 and second electrode 168, opposite the proximal ends, form a configuration end 189 and may be electrically coupled to one end of a first electrode 162A and one end of a second electrode 168A of another configurable leak detection extension system 100A. The connection means may be any suitable connection means known to those having ordinary skill in the relevant art. The output circuitry or device end 199B may be electrically coupled to a power and/or alert means. The power means may be any suitable power means and voltages known to those having ordinary skill in the relevant art. In some embodiments, the leak detection circuitry or device 190 may also comprise power and/or alert means therein. The alert means may be a visible and/or audible alert means generated from a light source, such as an LED light source, as an example, and/or speaker or any suitable alert means known to those having ordinary skill in the relevant art. The leak detection circuit or device 190 operates at low voltages such that currents are safely generated.

The leak detection region 160 is fixedly secured to liquid cooling bases via the at least an attachable region 140. The at least an attachable region 140 may be any suitable attachable material known to those of ordinary skill in the relevant art such as at least one of a button, toggle, zipper, Velcro, or fabric ties or laces, or any combination of the foregoing. In some embodiments the attachable material is a stretchable material, as examples, 2-way or 4-way stretch materials, attached to the at least a leak detection region 160, configured such that the at least a leak detection covering is slip on fastened to the vessel in one-step. In some embodiments, the at least a leak detection covering is turned inside out or outside in to rotate the surfaces of the first insulating material or first and second insulating materials in contact with the vessel, such as rotation between the first inner and outer surfaces of the first insulating material or rotation between the first inner surface of the first insulating material and second outer surface of the second insulating material. In some embodiments, the surfaces are rotated for convenience of attachment. In some embodiments, the surfaces are rotated for aesthetics, whereby the rotated surfaces are different colored or textured surfaces. In some embodiments, the surfaces are rotated for functionality, for example, increasing electrical conductivity on a side that may be more conducive therefor or visible determination when one side may already be stained, thus, switching to a non-stained side.

Figure 2A:
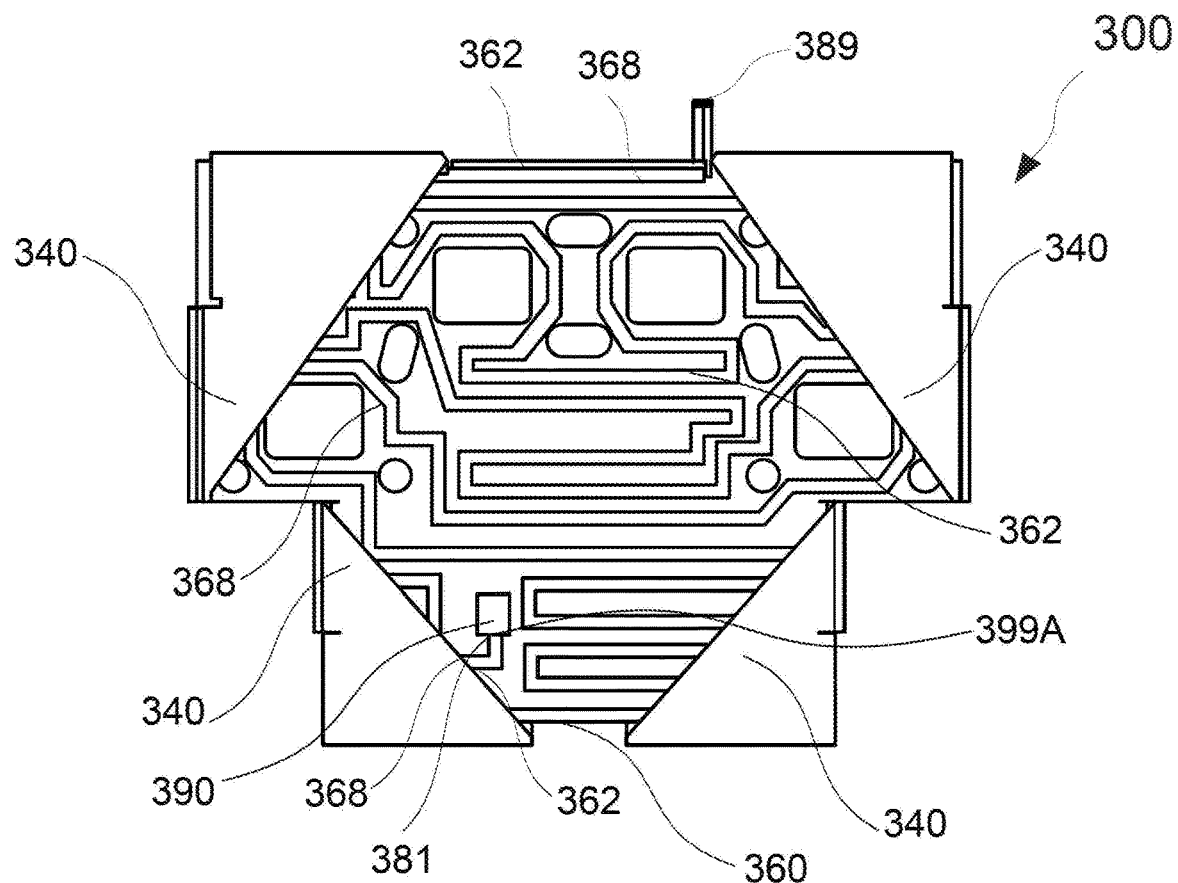
FIG. 2A is a schematic perspective first view of an alternative configurable leak detection system, according to an example embodiment.
Figure 2B:
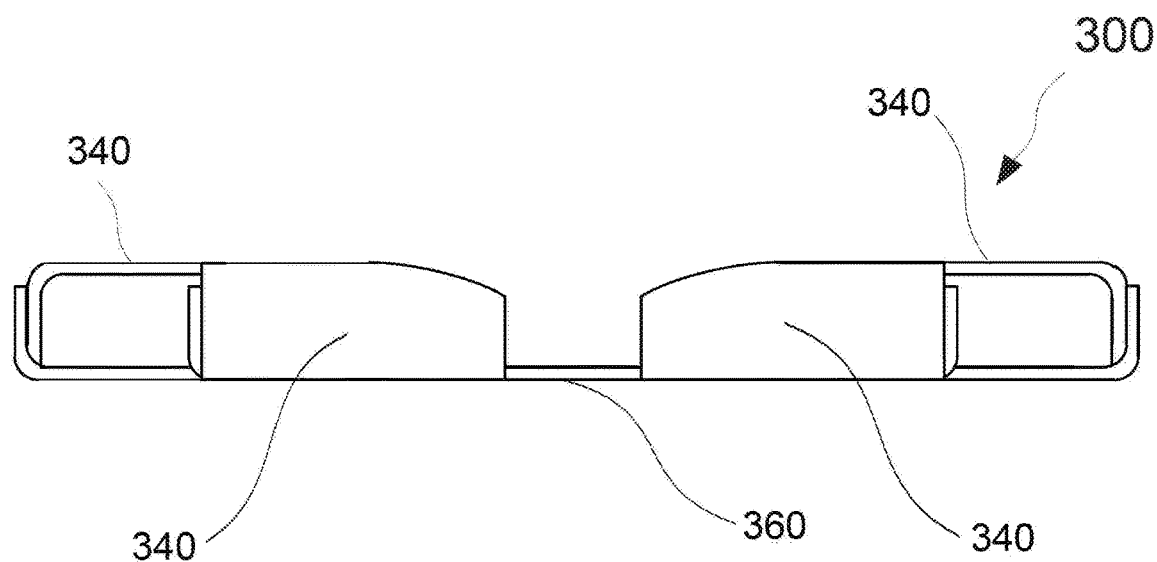
FIG. 2B is a schematic perspective second view of the alternative configurable leak detection system of FIG. 2A, according to an example embodiment.
Figure 2C:
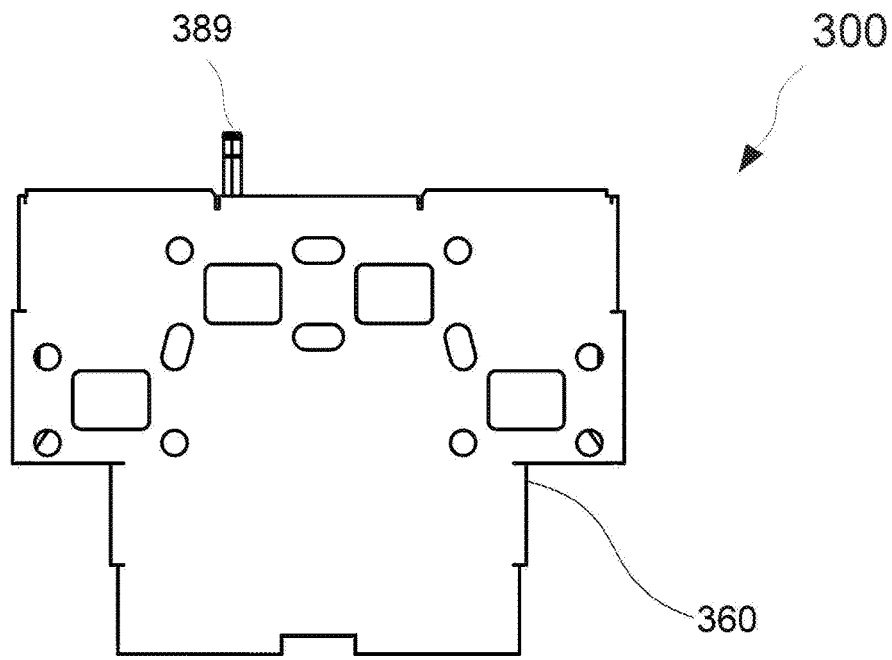
FIG. 2C is a schematic perspective third view of the alternative configurable leak detection system of FIG. 2A, according to an example embodiment.
Figure 2D:
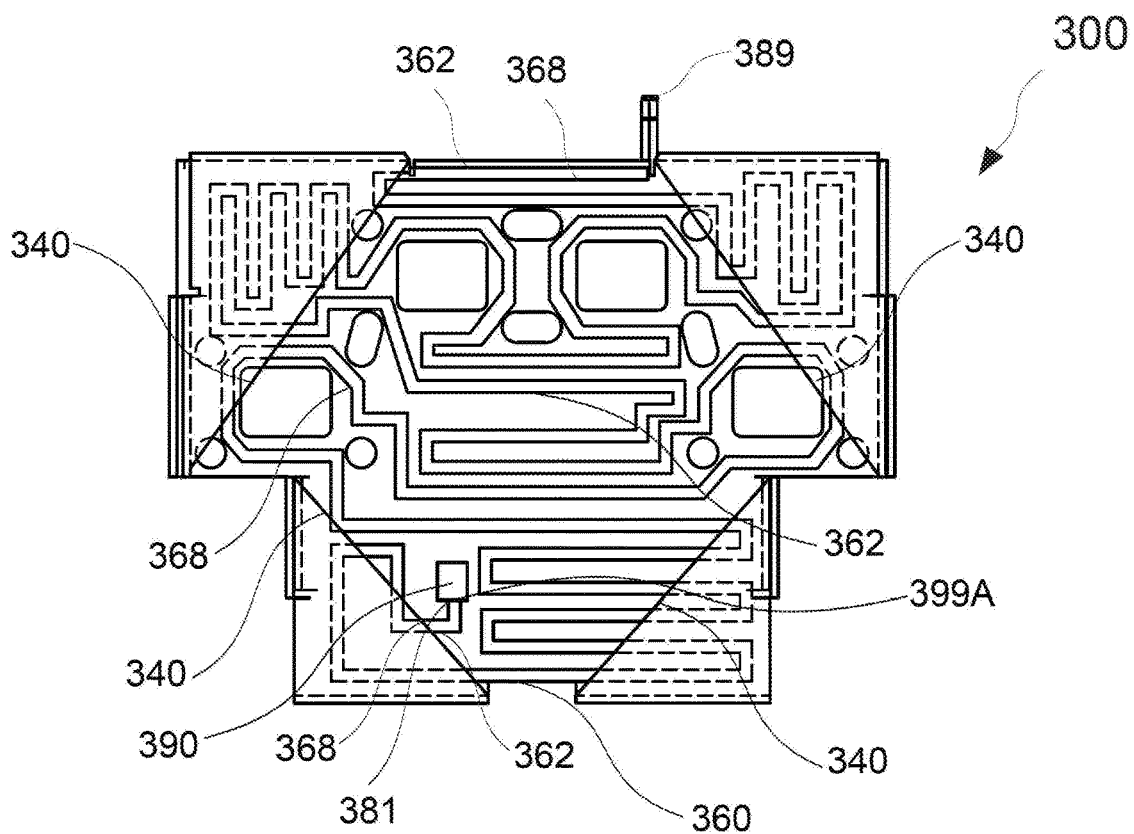
FIG. 2D is a schematic perspective first interior view of the alternative configurable leak detection system of FIG. 2A, according to an example embodiment.

During operation, the configurable leak detection system 100 may be easily secured to at least one base, such as pump bases, radiator bases and other types of heat exchanger bases known to those having ordinary skill in the relevant art where leak detection may be required. In some embodiments, the at least an attachable region 140 provides a simple, one-step slip on method. The bases may be of different sizes or shapes. In some embodiments, the bases are quadrilateral shaped. However, the embodiments are not limited to the above. In alternative embodiments, a configurable leak detection system 300 may be easily secured to a liquid cooling system, such as a cooling system having more than one base, and any other types of liquid cooling systems known to those having ordinary skill in the relevant art where leak detection encompassing at least the region of the more than one base may be required, via an at least an attachable region 340, also providing a simple, one-step slip on method. FIG. 2A is a schematic perspective first view of an alternative configurable leak detection system, according to an example embodiment. FIG. 2B is a schematic perspective second view of the alternative configurable leak detection system of FIG. 2A, according to an example embodiment. FIG. 2C is a schematic perspective third view of the alternative configurable leak detection system of FIG. 2A, according to an example embodiment. FIG. 2D is a schematic perspective first interior view of the alternative configurable leak detection system of FIG. 2A, according to an example embodiment. In some embodiments, the shape of the at least a leak detection covering is a single plane surface shape, a pattern of the corresponding first and second electrodes 162, 168 comprises at least a change of direction, and the liquid cooling system comprises at least four quadrilateral shaped heat exchangers. Those having ordinary skill in the relevant art may readily appreciate that the liquid cooling systems may comprise more or less than four quadrilateral shaped or different shaped heat exchangers, and the embodiments are not limited thereto.

In some embodiments, the single plane surface shape of the at least a leak detection covering is T-shaped, and the amount of the at least an attachable region is two or greater; however, the embodiments are not limited thereto. The cooling systems may be any suitable shape known to those of ordinary skill in the art. Referring to FIGS. 2A to 2D, a configurable leak detection system 300, detecting leakage from at least a vessel having pressurized fluid therein, comprising a leak detection circuit or device 390 and at least a leak detection covering is provided. The at least a leak detection covering comprises a leak detection region 360 having a first electrode 362 and a second electrode 368, and an at least an attachable region 340. In some embodiments, the amount of the at least an attachable regions is four, assuring a simple, one-step slip on method of the configurable leak detection system 300 to the liquid cooling system. In some embodiments, the leak detection circuitry or device 390 is an electrically operated circuitry known to those having ordinary skill in the relevant art that may detect impedance changes (i.e., reductions in resistance) resulting from the presence of water and/or other conductive liquids between the first electrode 362 and second electrode 368, as an example, having an alert means.

In some embodiments, the leak detection region 360 includes a first insulating material layer having a first inner surface and a first outer surface. In some embodiments, the leak detection region 360 further includes a second insulating material layer opposed to the first insulating material layer, having a second inner surface and a second outer surface, whereby the second inner surface is fixed to the first outer surface of the first insulating material layer. The at least an attachable region 340 includes an attachable material, attached to the leak detection region 360, configured such that the at least a leak detection covering may be fastened to the vessel.

The leak detection region 360 is sufficiently stiff and configured for easy slip-on attachment to liquid cooling systems, bases, and/or fluid conduits via the at least an attachable region 340, without gathering or wrinkling. The leak detection region 360 is sufficiently thin, such that the flow of small quantities, e.g., droplets, of water and/or conductive liquid is not impeded. The first inner surface of the first insulating material layer is the portion of the at least a leak detection region 360 at least in partial contact with the liquid cooling systems, bases, and/or fluid conduits. In some embodiments, the second outer surface of the second insulating material layer is the portion of the leak detection region 360 opposite the first insulating material layer.

In some embodiments, the first electrode 362 and second electrode 368 is parallel and fixedly disposed on the first inner surface of the first insulating material layer, whereby the second electrode 368 is spaced apart from the first electrode 362 by a gap. In some embodiments, the first electrode 362 and second electrode 368 is parallel disposed between the first and second insulating material layers and in firm contact therewith. In such a configuration, the second inner surface is fixed to and in firm contact with the first and second electrodes 362, 368 and the first outer surface, whereby the first and second electrodes 362, 368 are fixedly disposed between the first and second insulating material layers and spaced apart from one another by the gap. In some embodiments, the first electrode 162 and second electrode 168 may travel in a generally linear direction before and after changing directions; however, the embodiments are not limited thereto. In alternative embodiments, in addition to generally linear direction before and after changing directions, the first electrode 362 and second electrode 368 may travel in sinuous patterns across a plane of the leak detection region 360, such that all points on the leak detection region 360 are between the first electrode 362 and second electrode 368 for small leak detection. The first electrode 362 and second electrode 368 are spaced apart from one another by a gap. The gap may be a width of the first electrode 362 or second electrode 368, or greater, depending upon the sensitivity of the leak detection circuitry or device 390; however, the embodiments are not limited thereto. The distance of the gap may vary, and in certain regions, may be smaller than a width of the first electrode 362 or second electrode 368 if required.

A coupling end 381 formed by proximal ends of the first electrode 362 and second electrode 368 of the leak detection region 360 may be electrically coupled to the leak detection circuitry or device 390 and a configuration end 389, opposite the proximal ends, formed by distal ends of the first electrode 362 and second electrode 368 may be electrically coupled to one end of a first electrode 162A and one end of a second electrode 168A of another configurable leak detection extension system 100A. The connection means may be any suitable connection means known to those having ordinary skill in the relevant art. The leak detection circuitry or device 390 may be electrically coupled to a power and/or alert means. The power means may be any suitable power means and voltages known to those having ordinary skill in the relevant art. The alert means may be a visible and/or audible alert means generated from a speaker or any suitable alert means known to those having ordinary skill in the relevant art. The leak detection circuit or device 390 operates at low voltages such that currents are safely generated. The leak detection region 360 is fixedly secured to liquid cooling systems via the at least an attachable region 340. The at least an attachable region 340 may be any suitable attachable material known to those of ordinary skill in the relevant art such as at least one of a button, toggle, zipper, Velcro, or fabric ties or laces, or any combination of the foregoing. In some embodiments the attachable material is a stretchable material, as examples, 2-way or 4-way stretch materials, attached to the at least a leak detection region 360, configured such that the at least a leak detection covering is slip on fastened to the vessel in one-step. In some embodiments, the at least a leak detection covering is turned inside out or outside in to rotate the surfaces of the first insulating material or first and second insulating materials in contact with the vessel, such as rotation between the first inner and outer surfaces of the first insulating material or rotation between the first inner surface of the first insulating material and second outer surface of the second insulating material. In some embodiments, the surfaces are rotated for convenience of attachment. In some embodiments, the surfaces are rotated for aesthetics, whereby the rotated surfaces are different colored or textured surfaces. In some embodiments, the surfaces are rotated for functionality, for example, increasing electrical conductivity on a side that may be more conducive therefor or visible determination when one side may already be stained.

Figure 3A:
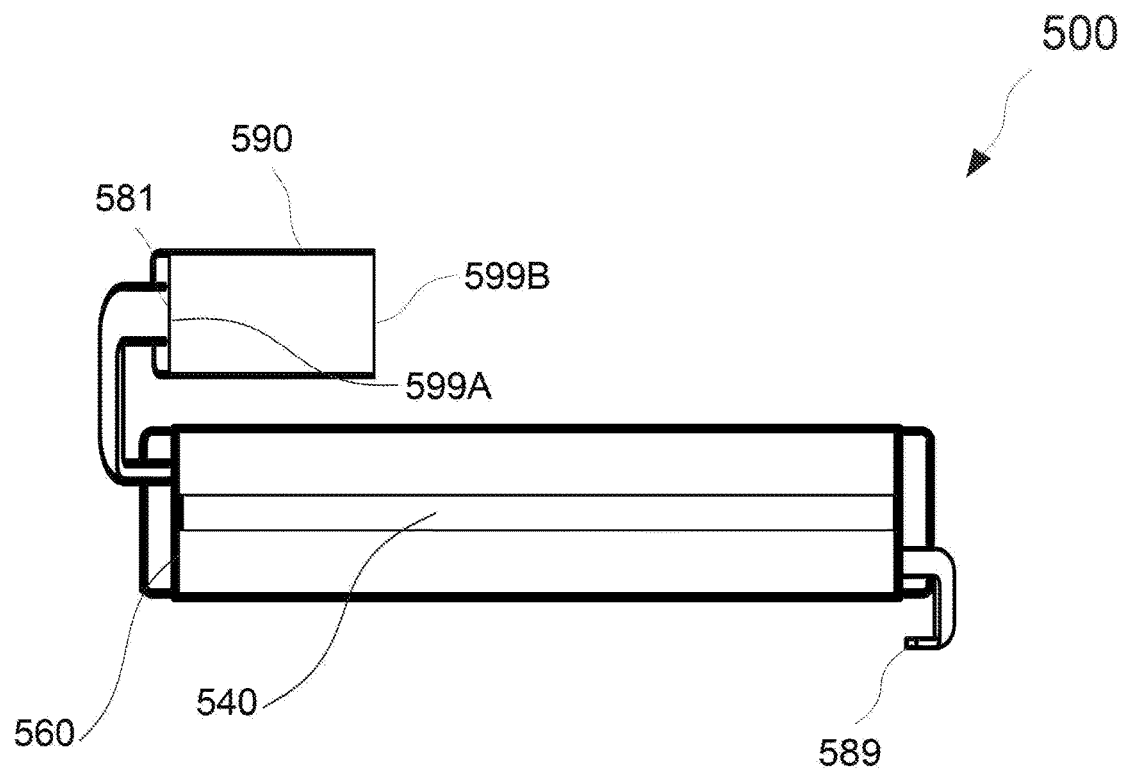
FIG. 3A is a schematic perspective first view of another alternative configurable leak detection system, according to an example embodiment.
Figure 3B:
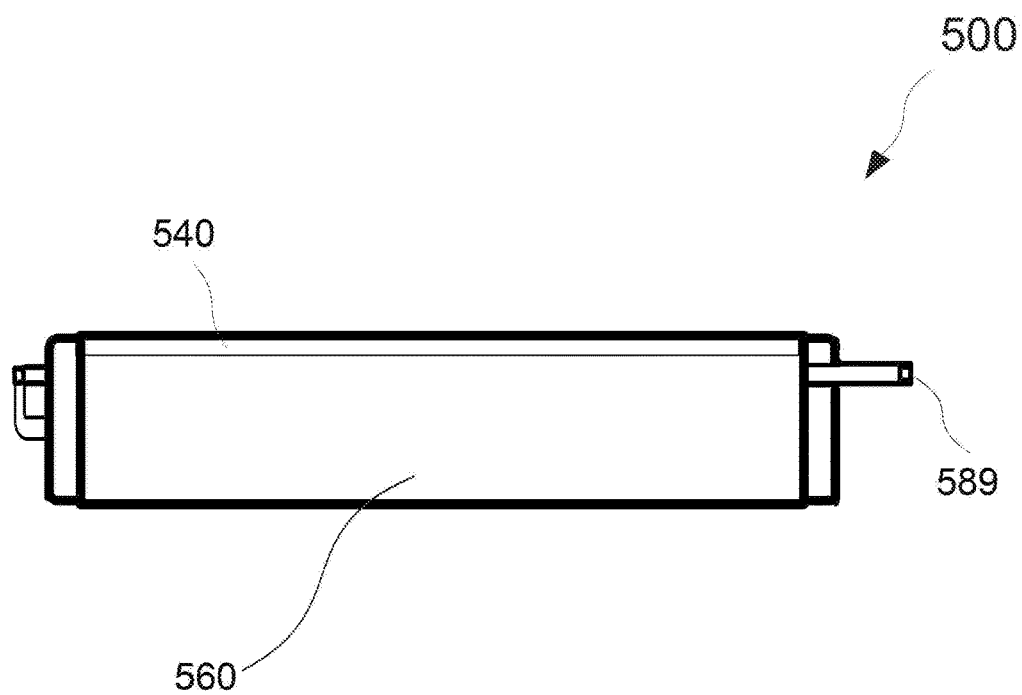
FIG. 3B is a schematic perspective second view of the another alternative configurable leak detection system of FIG. 3A, according to an example embodiment.
Figure 3C:
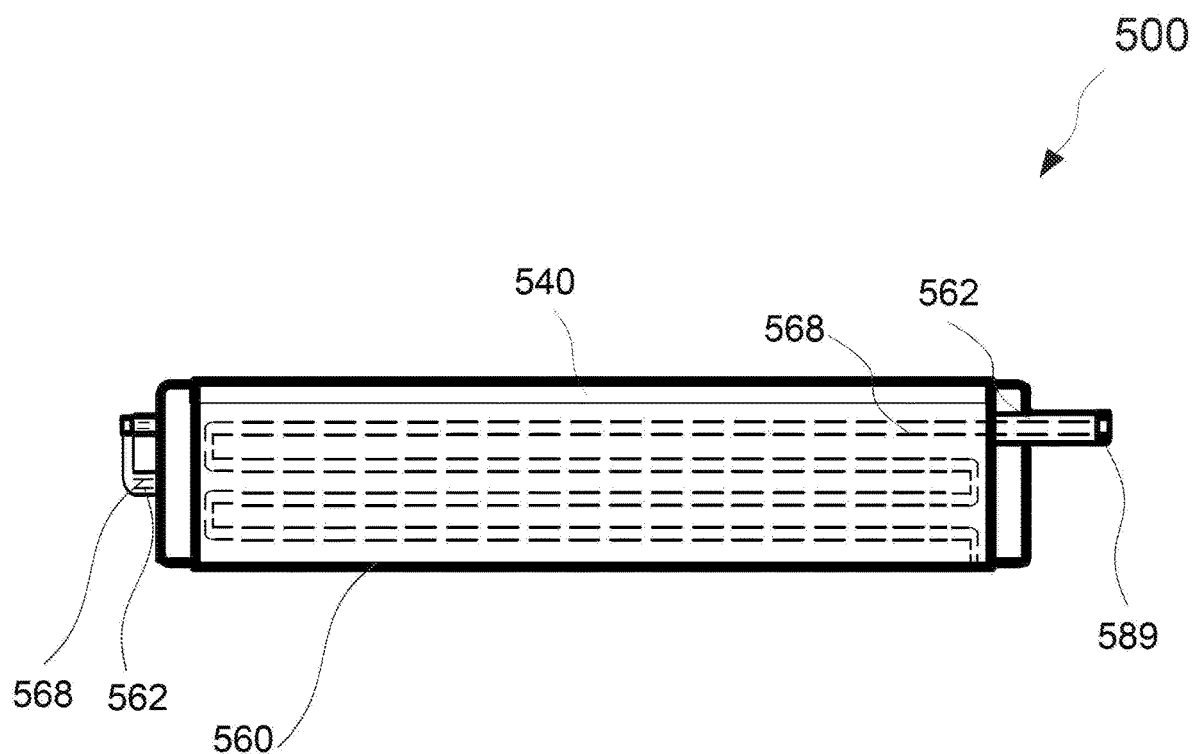
FIG. 3C is a schematic perspective second interior view of the another alternative configurable leak detection system of FIG. 2A, according to an example embodiment.

During operation, as an example, the configurable leak detection system 300 may be easily secured to a cooling system having four bases, such as heat exchanger bases having cooling liquid travelling therethrough, pump bases and/or other types of heat exchanger bases known to those having ordinary skill in the relevant art where leak detection may be required, via the four at least an attachable regions providing a simple, one-step slip on method. The configurable leak detection system 300 and bases may be of different sizes or shapes. In another alternative embodiments, a configurable leak detection system 500 may be easily secured to flexible and/or rigid fluid conduits, via an at least an attachable region 540, also providing a simple, one-step slip on method. FIG. 3A is a schematic perspective first view of another alternative configurable leak detection system, according to an example embodiment. FIG. 3B is a schematic perspective second view of the another alternative configurable leak detection system of FIG. 3A, according to an example embodiment. FIG. 3C is a schematic perspective second interior view of the another alternative configurable leak detection system of FIG. 2A, according to an example embodiment. In some embodiments, the flexible and/or rigid fluid conduits are generally tubular-shaped; however, the embodiments are not limited thereto. The flexible and/or rigid fluid conduits may be any suitable shape known to those of ordinary skill in the art, whereby fluid may flow therethrough. Referring to FIGS. 3A to 3C, and referring to FIGS. 1A to 2D, a configurable leak detection system 500, detecting leakage from at least a vessel having pressurized fluid therein, comprising a leak detection circuit or device 590 and at least a leak detection covering. The at least a leak detection covering comprises a leak detection region 560 having a first electrode 562 and a second electrode 368, and an at least an attachable region 540. In some embodiments, the amount of the at least an attachable regions is one, assuring a simple, one-step slip on method of the configurable leak detection system 500 to the fluid conduits. In some embodiments, the leak detection circuitry or device 590 is an electrically operated device having electrical circuitry known to those having ordinary skill in the relevant art that may detect impedance changes (i.e., reductions in resistance) resulting from the presence of water and/or other conductive liquids between the first electrode 562 and second electrode 568, as an example, and having an alert means.

In some embodiments, the leak detection region 560 includes a first insulating material layer having a first inner surface and a first outer surface. In some embodiments, the leak detection region 560 further includes a second insulating material layer opposed to the first insulating material layer, having a second inner surface and a second outer surface, whereby the second inner surface is fixed to the first outer surface of the first insulating material layer. The at least an attachable region 540 includes an attachable material, attached to the leak detection region 560, configured such that the at least a leak detection covering may be fastened to the vessel.

The at least a leak detection covering 560 is sufficiently stiff and configured for easy slip-on attachment to liquid cooling systems, bases, and/or fluid conduits via the at least an attachable region 540, without gathering or wrinkling. The at least a leak detection covering 560 is sufficiently thin, such that the flow of small quantities, e.g., droplets, of water and/or conductive liquid is not impeded. The first inner surface of the first insulating material layer is the portion of the at least a leak detection covering 560 at least in partial contact with the liquid cooling systems, bases, and/or fluid conduits. In some embodiments, the second outer surface of the second insulating material layer is the portion of the leak detection cover 560 opposite the first inner surface of the first insulating material layer.

In some embodiments, the first electrode 562 and second electrode 568 is parallel and fixedly disposed on the first inner surface of the first insulating material layer, whereby the second electrode 568 is spaced apart from the first electrode 562 by a gap. In some embodiments, the first electrode 562 and second electrode 568 is parallel disposed between the first and second insulating material layers and in firm contact therewith. In such a configuration, the second inner surface is fixed to and in firm contact with the first and second electrodes 562, 568 and the first outer surface, whereby the first and second electrodes 562, 568 are fixedly disposed between the first and second insulating material layers and spaced apart from one another by the gap. In some embodiments, for a larger leak detection region having a similar shape as the leak detection region 160 of the configurable leak detection system 100 of FIGS. 1A to 1C or the leak detection region 560 of the configurable leak detection system 500 of FIGS. 3A to 3C, the first electrode 162, 562 and second electrode 168, 568 may have two, four, six, etc. winds forming three, five, seven, etc. rows of the parallel disposed first electrode 162, 562 and second electrode 168, 568, respectively. The first electrode 562 and second electrode 568 are spaced apart from one another by a gap. The gap may be a width of the first electrode 562 or second electrode 568, or greater, depending upon the sensitivity of the leak detection circuitry or device 590; however, the embodiments are not limited thereto. The distance of the gap may vary, and in certain regions, may be smaller than a width of the first electrode 562 or second electrode 568 if required.

A coupling end 581 formed by proximal ends of the first electrode 562 and second electrode 568 of the at least a leak detection covering 560 may be electrically coupled to the leak detection circuitry or device 590 and a configuration end 589, opposite the proximal ends, formed by distal ends of the first electrode 562 and second electrode 568 may be electrically coupled to one end of a first electrode 162A and one end of a second electrode 168A of another configurable leak detection extension system 100A. The connection means may be any suitable connection means known to those having ordinary skill in the relevant art. The leak detection circuitry or device 590 may be electrically coupled to a power and/or alert means. The power means may be any suitable power means and voltages known to those having ordinary skill in the relevant art. The alert means may be a visible and/or audible alert means generated from a speaker or any suitable alert means known to those having ordinary skill in the relevant art. The leak detection circuit or device 590 operates at low voltages such that currents are safely generated. The leak detection region 560 is fixedly secured to liquid cooling fluid conduits via the at least an attachable region 540. The at least an attachable region 540 may be any suitable attachable material known to those of ordinary skill in the relevant art such as at least one of a button, toggle, zipper, Velcro, or fabric ties or laces, or any combination of the foregoing. In some embodiments the attachable material is a stretchable material, as examples, 2-way or 4-way stretch materials, attached to the at least a leak detection region 560, configured such that the at least a leak detection covering is slip on fastened to the vessel in one-step. In some embodiments, the at least a leak detection covering is turned inside out or outside in to rotate the surfaces of the first insulating material or first and second insulating materials in contact with the vessel, such as rotation between the first inner and outer surfaces of the first insulating material or rotation between the first inner surface of the first insulating material and second outer surface of the second insulating material. In some embodiments, the surfaces are rotated for convenience of attachment. In some embodiments, the surfaces are rotated for aesthetics, whereby the rotated surfaces are different colored or textured surfaces. In some embodiments, the surfaces are rotated for functionality, for example, increasing electrical conductivity on a side that may be more conducive therefor or visible determination when one side may already be stained.

Figure 4A:
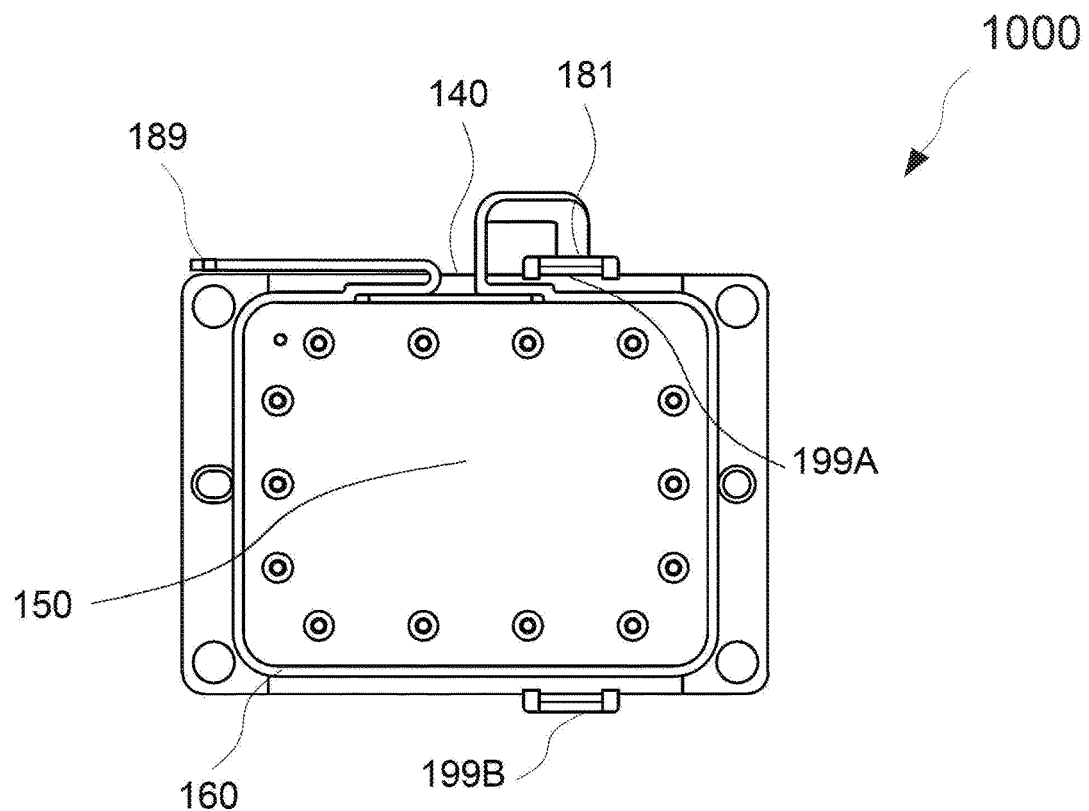
FIG. 4A is a schematic perspective third view of the configurable leak detection system of FIG. 1A assembled to a liquid cooling assembly base, according to an example embodiment.
Figure 4B:
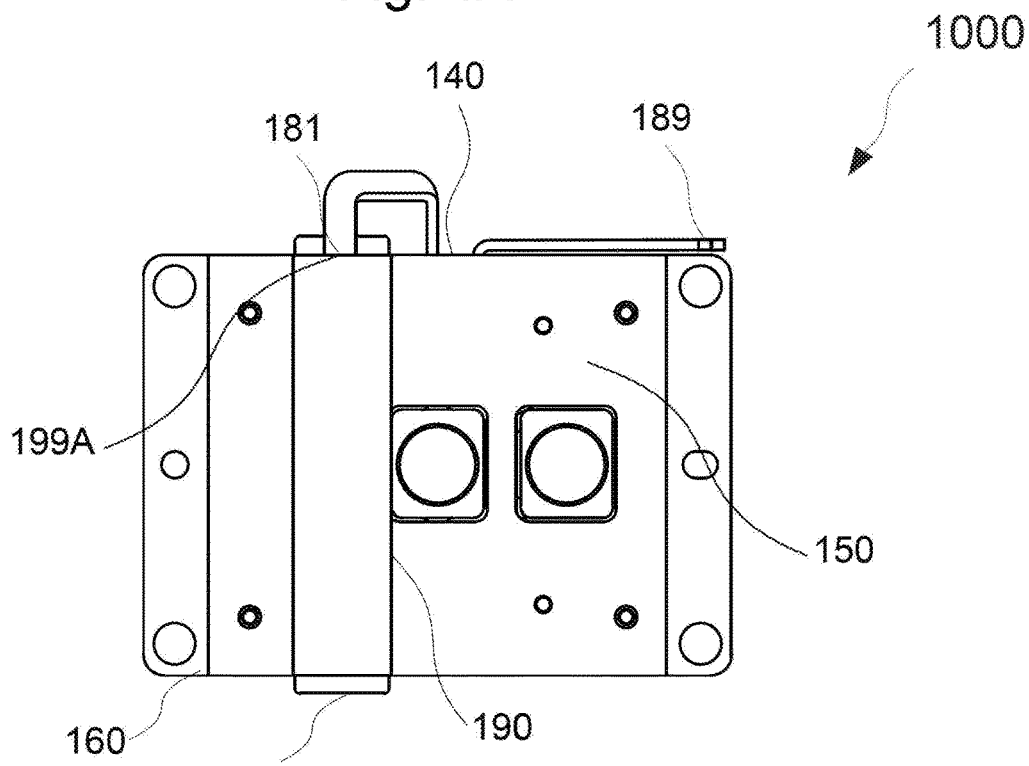
FIG. 4B is a schematic perspective first view of the configurable leak detection system of FIG. 1A assembled to the liquid cooling assembly base of FIG. 4A, according to an example embodiment.
Figure 5A:
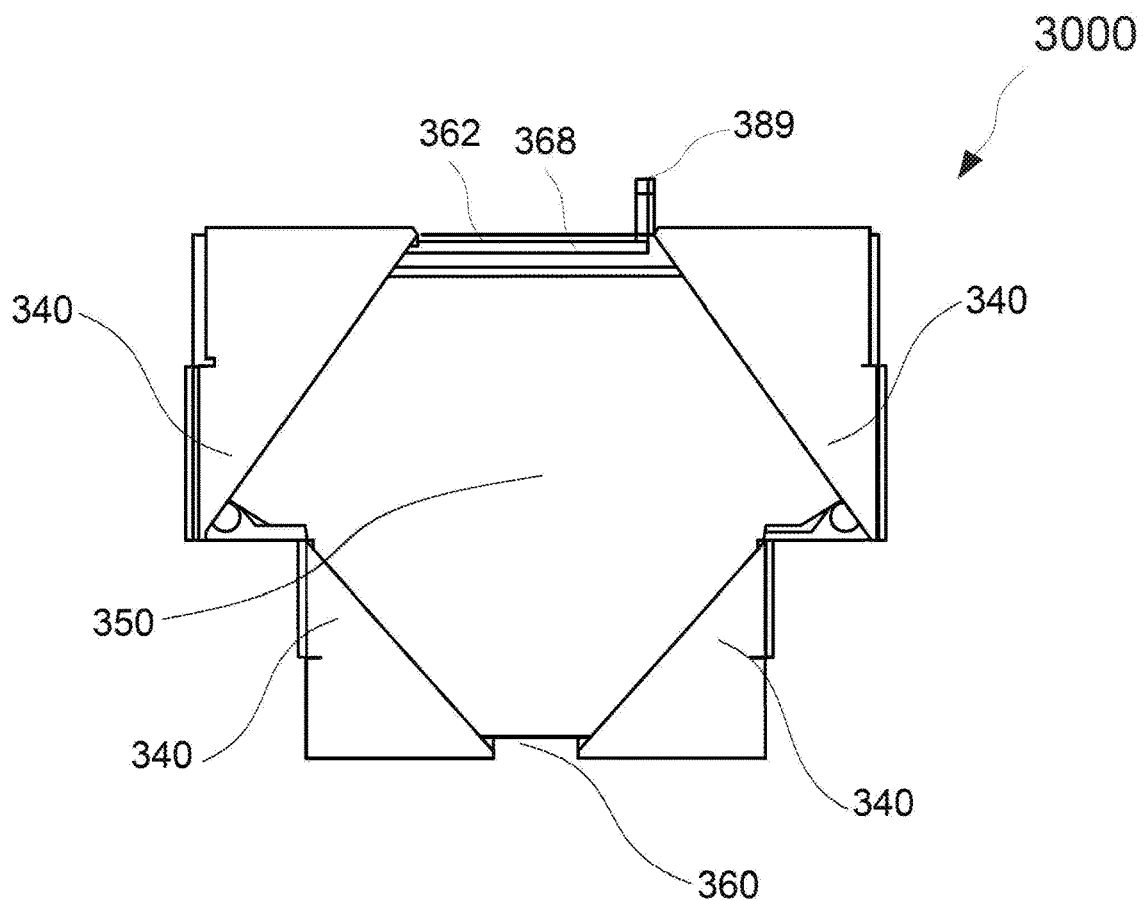
FIG. 5A is a schematic perspective first view of the alternative configurable leak detection system of FIG. 2A assembled to an electronic system having a liquid cooling system therein, according to an example embodiment.
Figure 5B:
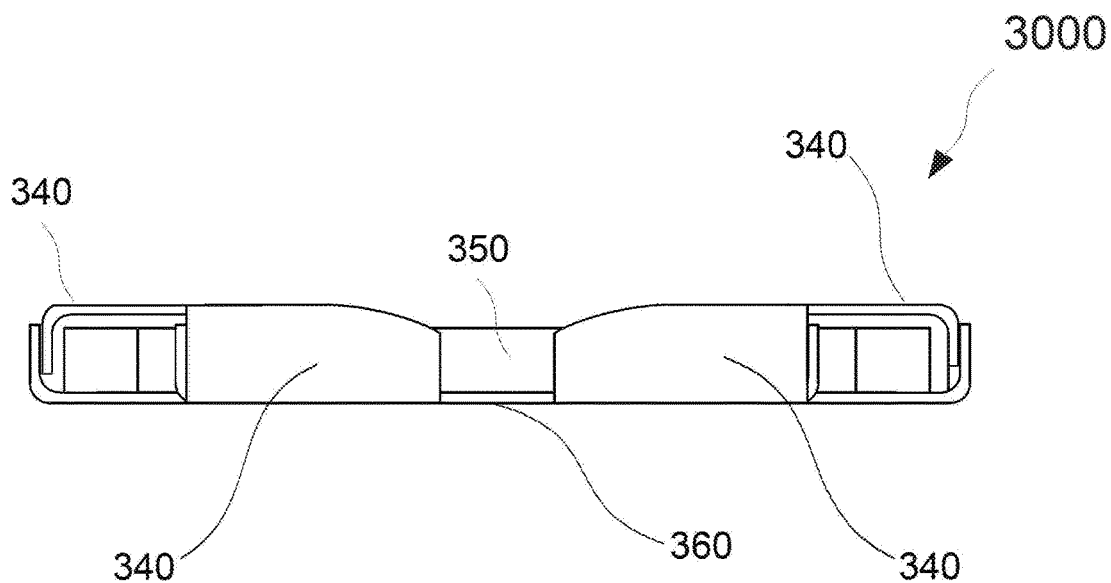
FIG. 5B is a schematic perspective second view of the alternative configurable leak detection system of FIG. 2A assembled to an electronic system having a liquid cooling system therein of FIG. 5A, according to an example embodiment.
Figure 6:
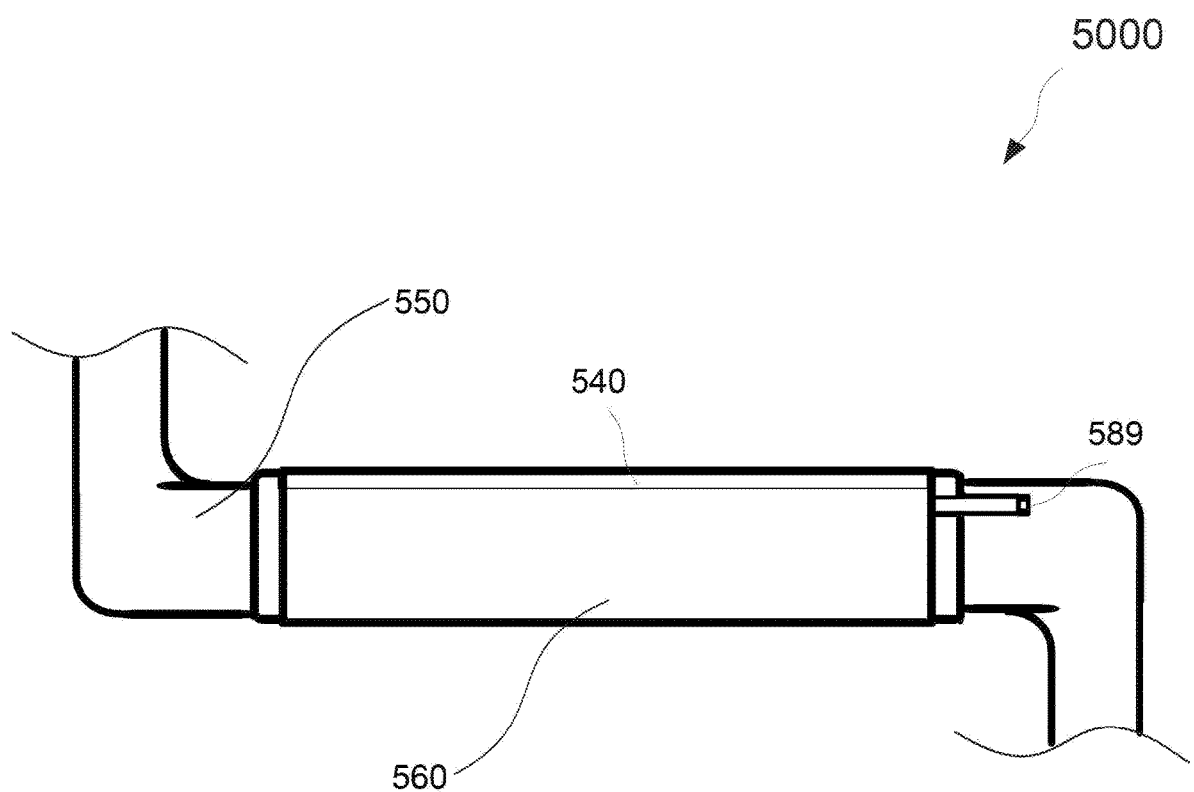
FIG. 6 is a schematic perspective second view of the another alternative configurable leak detection system of FIG. 3A assembled to a fluid conduit, according to an example embodiment.

The liquid cooling systems, bases, and/or fluid conduits having the configurable leak detection system of the embodiments may be employed to cool at least one of an element, module, device and/or system. FIG. 4A is a schematic perspective third view of the configurable leak detection system of FIG. 1A assembled to a liquid cooling assembly base, according to an example embodiment. FIG. 48 is a schematic perspective first view of the configurable leak detection system of FIG. 1A assembled to the liquid cooling assembly base of FIG. 4A, according to an example embodiment. FIG. 5A is a schematic perspective first view of the alternative configurable leak detection system of FIG. 2A assembled to an electronic system having a liquid cooling system therein, according to an example embodiment. FIG. 5B is a schematic perspective second view of the alternative configurable leak detection system of FIG. 2A assembled to an electronic system having a liquid cooling system therein of FIG. 5A, according to an example embodiment. FIG. 6 is a schematic perspective second view of the another alternative configurable leak detection system of FIG. 3A assembled to a fluid conduit, according to an example embodiment. Referring to FIGS. 4A to 6, and referring to FIGS. 1A to 3C, the configurable leak detection system 100 of FIGS. 1A to 1C, the configurable leak detection system 300 of FIGS. 2A to 2D, and the configurable leak detection system 500 of FIGS. 3A to 3C, may be easily assembled to various liquid cooling systems 350, bases 150, and/or fluid conduits 550, respectively.

During operation, when liquid leakage from the liquid cooling systems 350, bases 150, and/or fluid conduits 550 of the embodiments occur and liquid is leaked onto the leak detection region 160, 360, 560, the liquid will be absorbed into the fibers or materials of the inner and/or second insulating material layer, thereby increasing the electrical conductivity of the dampened region. As the liquid continues to drip or leak onto the inner and/or second insulating material layer, the liquid will migrate radially away from the initial contact point by diffusion and hydraulic flow, until the dampened region extends over some point on each of the first electrode 162, 362, 562 and second electrode 168, 368, 568. At this point, electrical current is conducted between the first electrode 162, 362, 562 and second electrode 168, 368, 568, providing a relatively low resistance path therebetween. As a result, the leak detection circuitry or device 190, 390, 590 will detect or measure an impedance change which will be sufficient to generate an alert means of the leak detection circuitry or device 190, 390, 590. The leak detection circuitry or device 190 is configured to detect and/or measure the impedance change by an appropriate electrical circuit known to those having ordinary skill in the relevant art, whereby an alert means may be generated. The alert means may be any one or more of an alert light, sound or any suitable alert means known to those having ordinary skill in the relevant art. Thereafter, a user may evaluate the significance of the leak and take appropriate action. Once the source of the leak has been established and the necessary repairs have been completed, if not already dried, the liquid leakage region is wiped clean and the leak detection circuitry or device 190, 390, 590 is reset for further use.

In some embodiments, automatic shut-down of a liquid cooling system may be configured following leak detection. In some embodiments, the configurable leak detection system 100, 300, 500 is configured to determine the exact location of the leakage following leak detection.

Figure 7A:
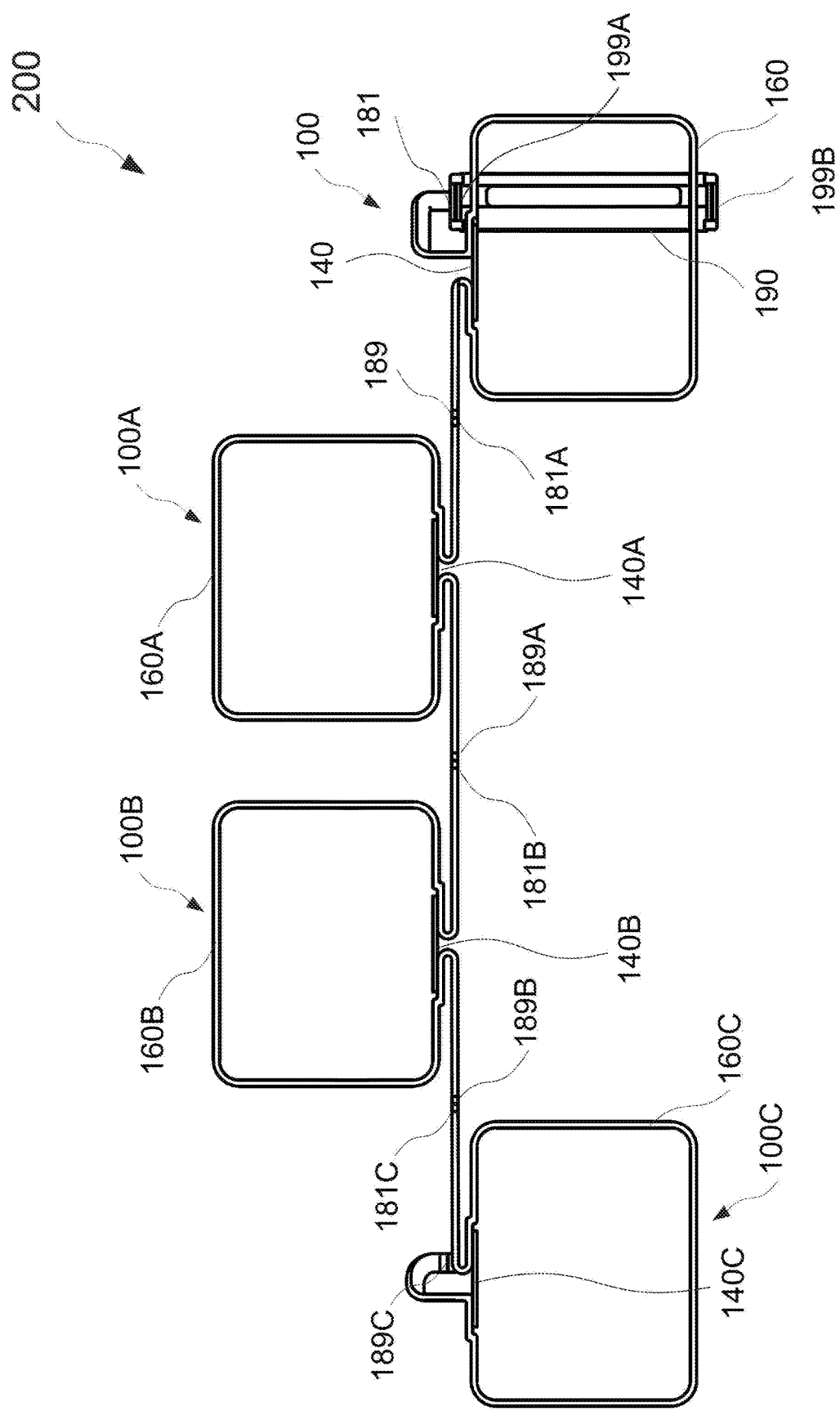
FIG. 7A is a schematic perspective third view of multiple configurable leak detection systems of FIG. 1A configured for multiple liquid cooling assembly bases of FIG. 4A, according to an example embodiment.
Figure 7B:
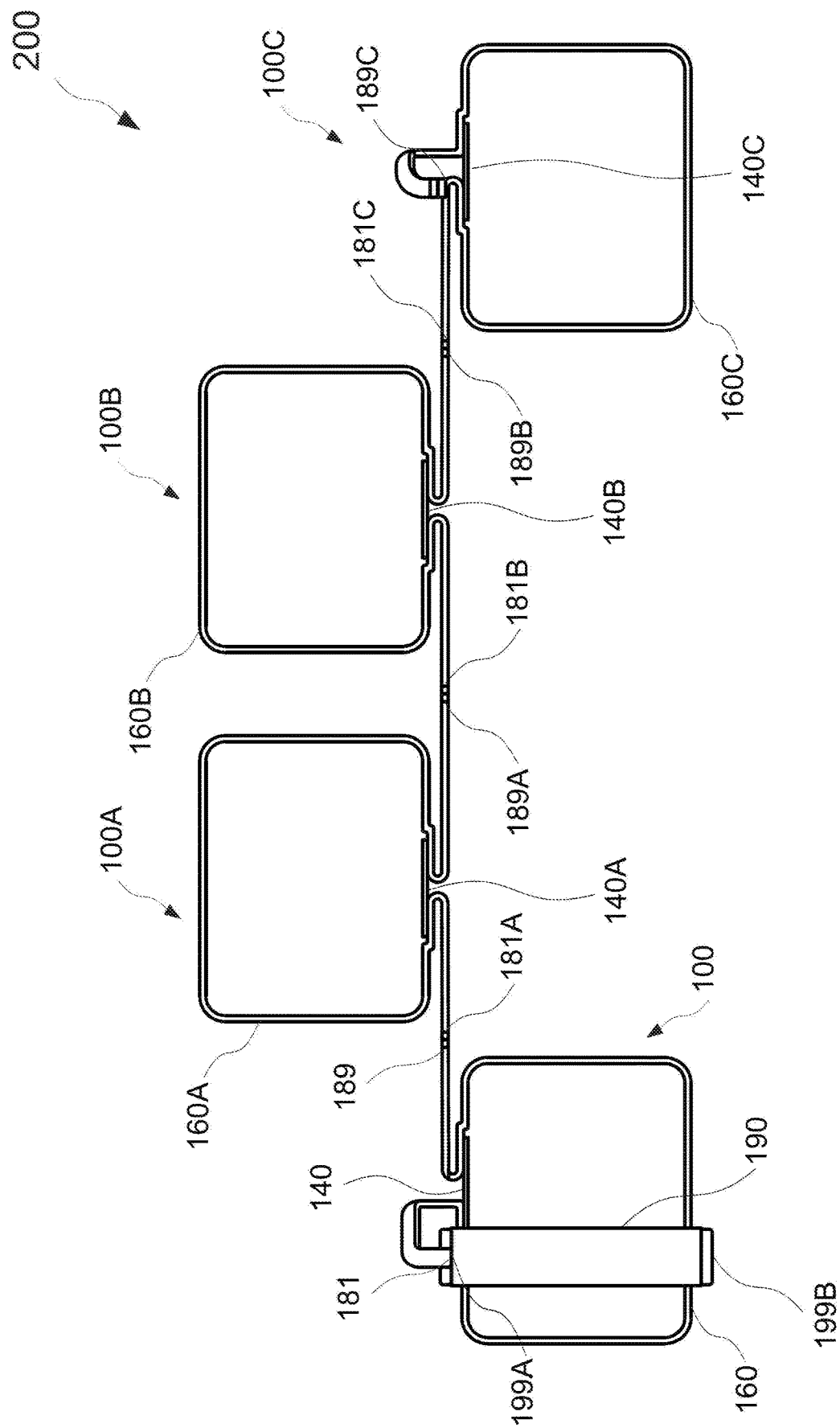
FIG. 7B is a schematic perspective first view of multiple configurable leak detection systems of FIG. 1A configured for multiple liquid cooling assembly bases of FIG. 4A, according to an example embodiment.

The configurable leak detection system 100, 300, 500 of the embodiments may be easily and simply fastened to more than one system 350, base 150, and/or fluid conduit 550 via the at least an attachable region 140, 340, 540, without gathering or wrinkling, and then simply and easily electrically coupled together, offering an endless amount of combinations of leak detection for liquid cooling systems, bases, and fluid conduits of all shapes and sizes. In some embodiments, the amount of the at least a leak detection covering is two or greater, and the two or greater at least a leak detection coverings are electrically coupled via configuration and coupling ends thereof, respectively. In some embodiments, the shape of the at least a leak detection covering is at least one of a single plane surface shape, multiple plane surface shape, or curved surface shape, or any combination of the foregoing, and a pattern of the corresponding first and second electrodes comprises at least a change of direction or no change of direction. FIG. 7A is a schematic perspective third view of multiple configurable leak detection systems of FIG. 1A configured for multiple liquid cooling assembly bases of FIG. 4A, according to an example embodiment. FIG. 7B is a schematic perspective first view of multiple configurable leak detection systems of FIG. 1A configured for multiple liquid cooling assembly bases of FIG. 4A, according to an example embodiment.

Figure 8A:
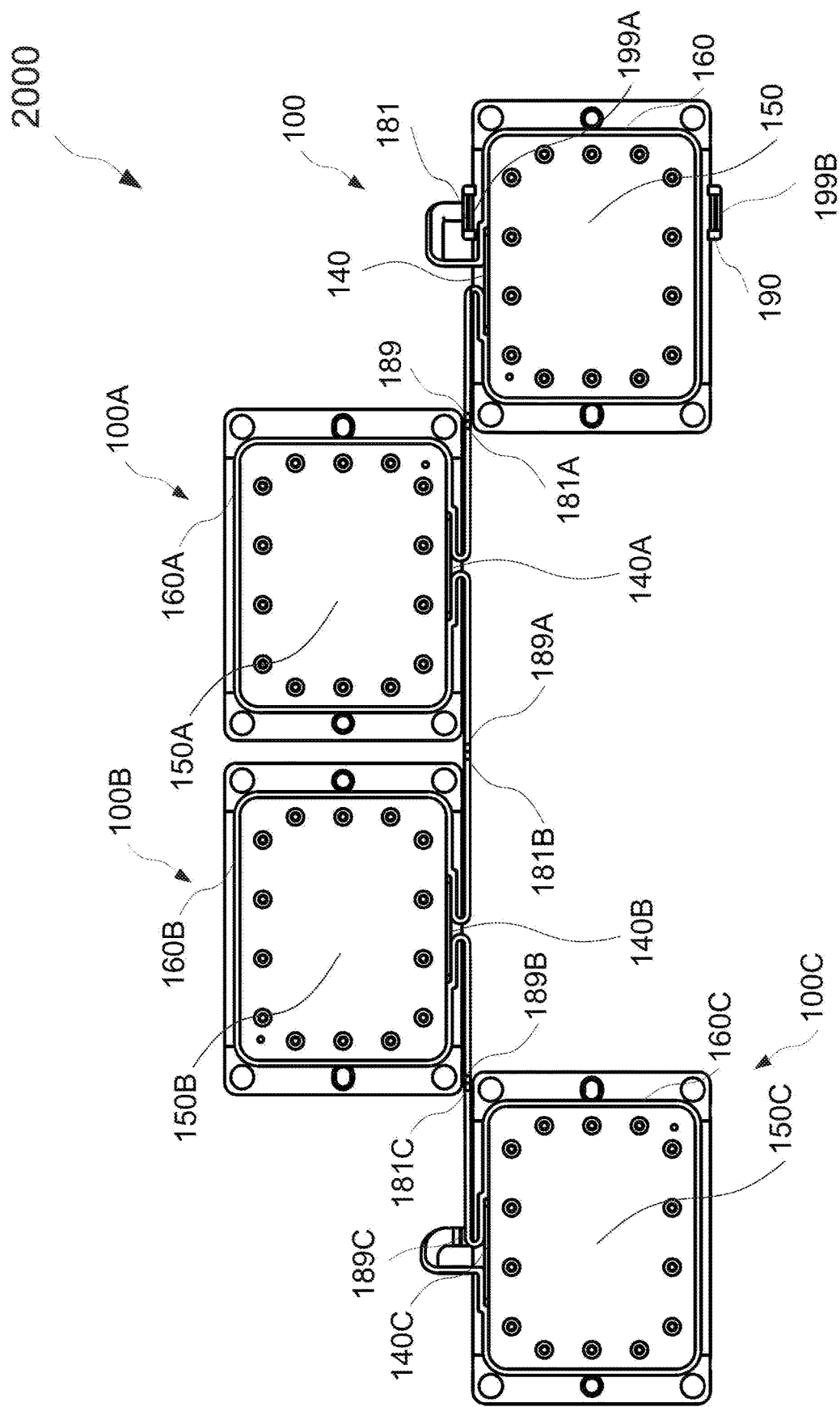
FIG. 8A is a schematic perspective third view of multiple configurable leak detection systems of FIG. 1A assembled to multiple liquid cooling assembly bases of FIG. 4A, according to an example embodiment.
Figure 8B:
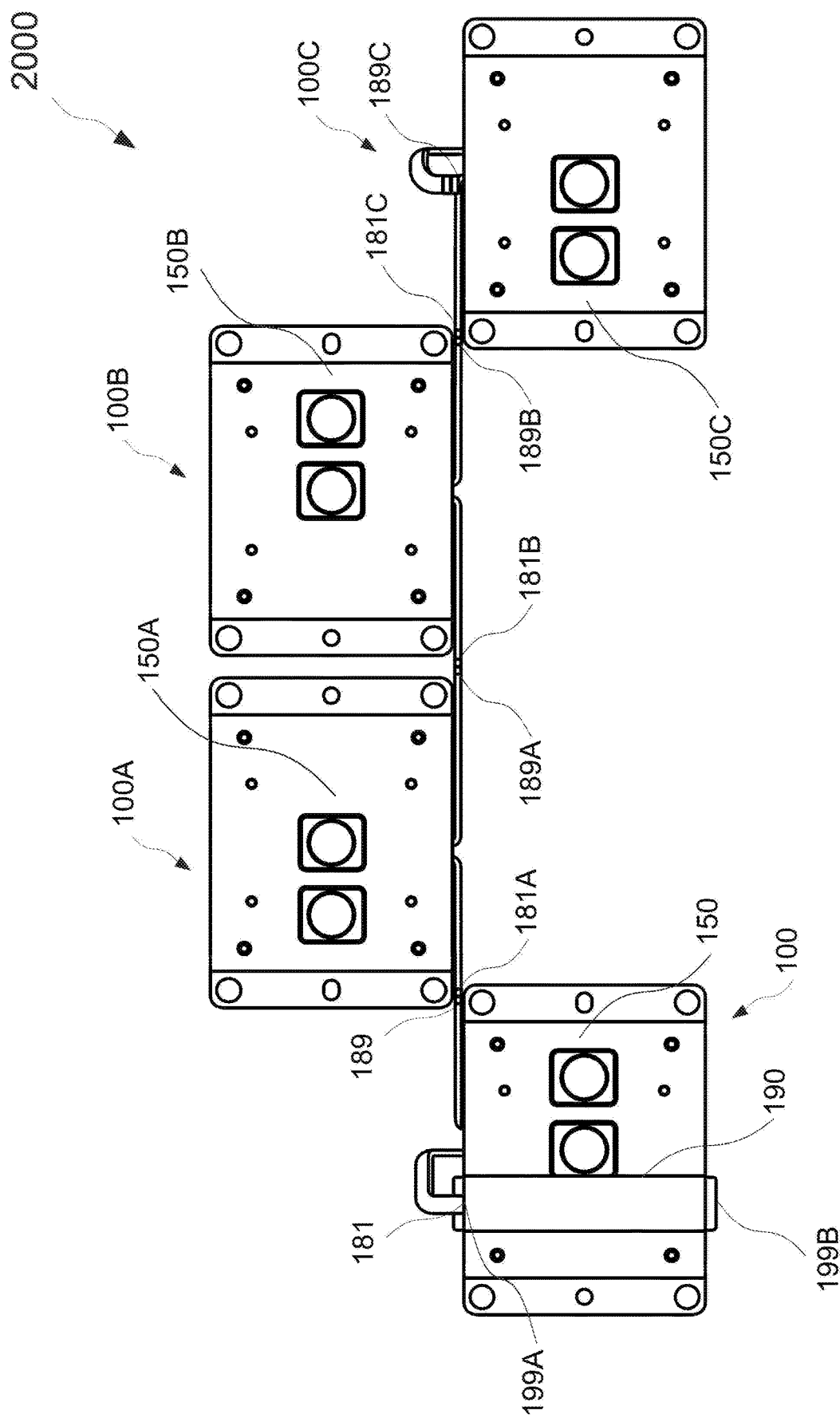
FIG. 8B is a schematic perspective first view of multiple configurable leak detection systems of FIG. 1A assembled to multiple liquid cooling assembly bases of FIG. 4A, according to an example embodiment.

FIG. 8A is a schematic perspective third view of multiple configurable leak detection systems of FIG. 1A assembled to multiple liquid cooling assembly bases of FIG. 4A, according to an example embodiment. FIG. 8B is a schematic perspective first view of multiple configurable leak detection systems of FIG. 1A assembled to multiple liquid cooling assembly bases of FIG. 4A, according to an example embodiment. FIG. 8C is a schematic perspective fifth view of multiple configurable leak detection systems of FIG. 1A assembled to multiple liquid cooling assembly bases of FIG. 4A, according to an example embodiment. Referring to FIGS. 7A to 8C, and referring to FIGS. 1A to 1C and FIGS. 4A to 4B, a multiple configurable leak detection system 200 comprises the configurable leak detection system 100 of FIGS. 1A to 1C, electrically coupled to three configurable leak detection extension systems 100A, 100B, 100C. A coupling end 181A of a first electrode 162A and second electrode 168A of a leak detection covering of the configurable leak detection extension system 100A is electrically coupled to the configuration end 189 of the first electrode 162 and second electrode 168 of a leak detection covering of the configurable leak detection system 100. A coupling end 1818 of a first electrode 162B and second electrode 168B of a leak detection covering of the configurable leak detection extension system 100B is electrically coupled to the configuration end 189A of the first electrode 162A and second electrode 168A of the of a leak detection covering of the configurable leak detection extension system 100A. A coupling end 181C of a first electrode 162C and second electrode 168C of a leak detection covering of the configurable leak detection extension system 100C is electrically coupled to the configuration end 1898 of the first electrode 162B and second electrode 168B of the of a leak detection covering of the configurable leak detection system 1008.

In some embodiments, multiple configurable leak detection systems may be easily and simply fastened to four bases 150, 150A, 150B, 150C via the at least an attachable region 140, 140A, 1408, 140C, without gathering or wrinkling, and then simply and easily electrically coupled together, offering an endless amount of combinations of leak detection for liquid cooling systems, bases, and/or fluid conduits of all shapes and sizes. The elements and features of the configurable leak detection system 100 and corresponding elements and features of the three configurable leak detection extension systems 100A, 100B, 100C are as described in detail in the embodiments, and for sake of brevity, will not repeated here.

Figure 9A:
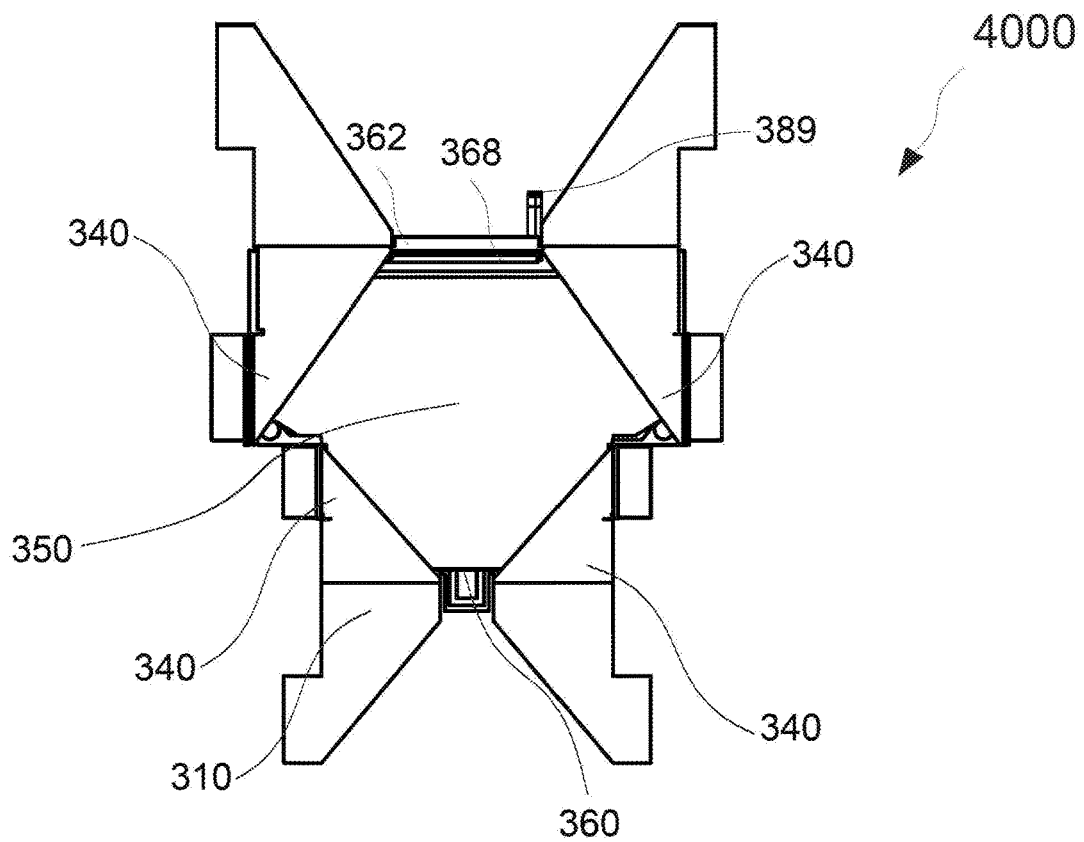
FIG. 9A is a schematic perspective first view of the alternative configurable leak detection system of FIG. 2A assembled to a chassis, according to an example embodiment.
Figure 9B:
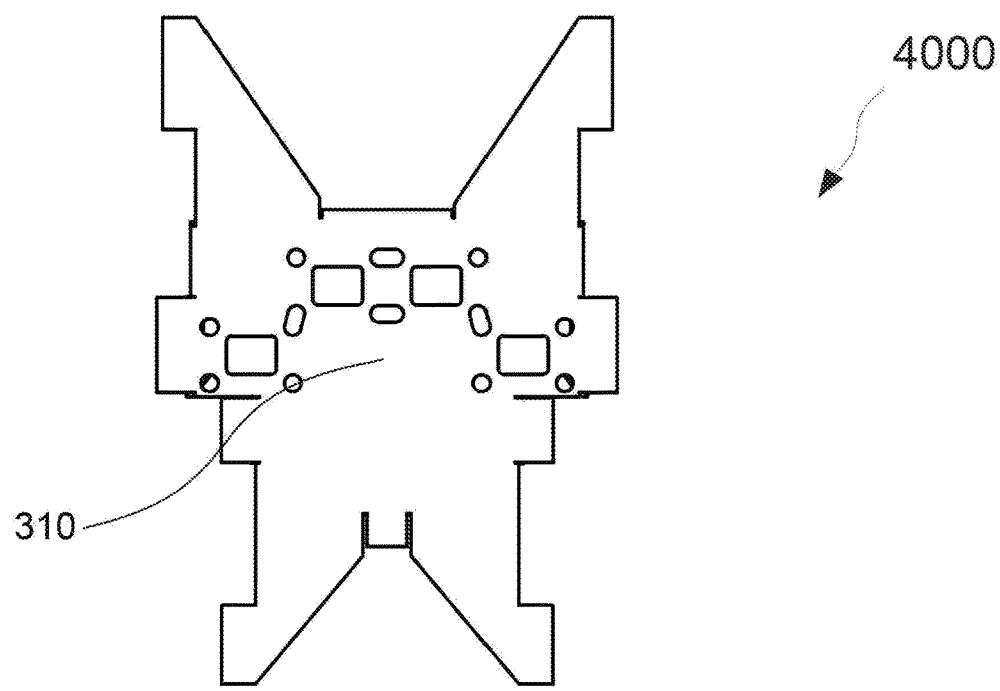
FIG. 9B is a schematic perspective third view of the alternative configurable leak detection system of FIG. 2A assembled to a chassis, according to an example embodiment.

In some embodiments, the liquid cooling systems, bases, and/or fluid conduits is configured to cool only selective heat generating devices, or only a single heat generating device. In alternative embodiments, the liquid cooling systems, bases, and/or fluid conduits is configured to cool more than one heat generating device as in FIGS. 2A to 2D, wherein the configurable leak detection system 300 is easily secured to a cooling system having four bases via the four at least an attachable regions providing a simple, one-step slip on method. In some embodiments, the configurable leak detection system 300 may also be fixedly secured to a larger chassis or bracketing system for attachment to a larger electric or electronics system, as an example. FIG. 9A is a schematic perspective first view of the alternative configurable leak detection system of FIG. 2A assembled to a chassis, according to an example embodiment. FIG. 9B is a schematic perspective third view of the alternative configurable leak detection system of FIG. 2A assembled to a chassis, according to an example embodiment. Referring to FIGS. 9A to 9I, and referring to FIGS. 2A to 2D and FIGS.

5A to 5B, the configurable leak detection system 300 is fixedly secured to a larger bracketing system 310. The bracketing system may be made of any suitable material known to those of ordinary skill in the art. The elements and features of the configurable leak detection system 300 are as described in detail in the embodiments, and for sake of brevity, will not repeated here.

Figure 10:
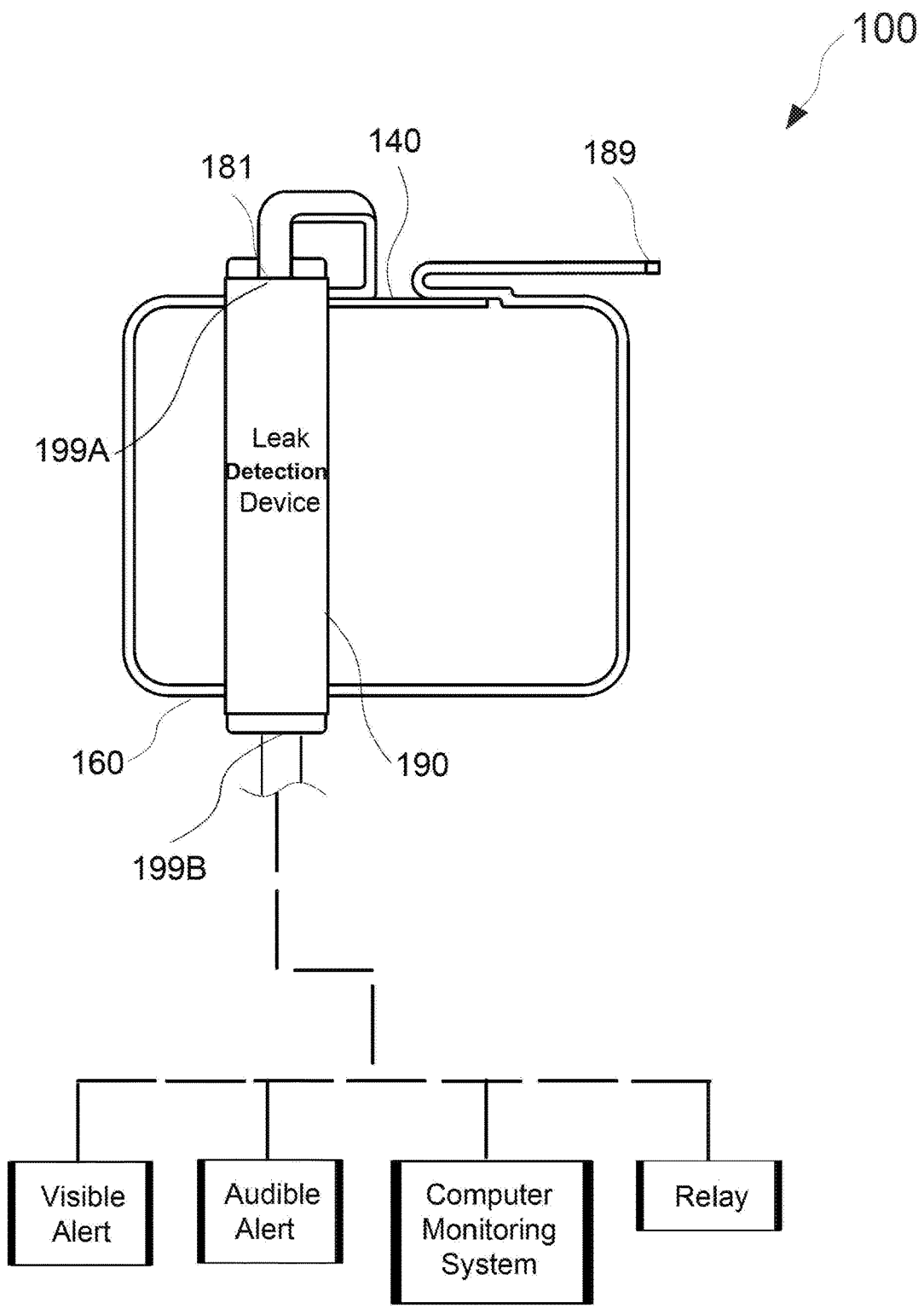
FIG. 10 is an illustration of a system employing the configurable leak detection system of FIG. 1A, according to an example embodiment.

The leak detection circuitry or device 190, 390, 590 may be electrically coupled to a power and/or alert means. The alert means may be a visible and/or audible alert means generated from a speaker or any suitable alert means known to those having ordinary skill in the relevant art. FIG. 10 is an illustration of a system employing the configurable leak detection system of FIG. 1A, according to an example embodiment. Referring to FIG. 10, and referring to FIGS. 1A to 9I, the leak detection circuitry or device 190 further comprises a sensing and transmitting means, for sensing decreases in the electrical resistance across the first electrode 162 and second electrode 168, and transmitting a signal. The leak detection circuitry or device 190 is interfaced to any suitable indicator or communications device for indicating when a leak has been detected. Examples include a visible alert and/or an audible alert via corresponding visual and/or audible devices, a computer monitoring system, and a relay for turning off or resetting of the configurable leak detection system 100.

In some embodiments, the leak detection region 160, 560 described show a covering with a relatively uniform distribution of the first electrode 162, 562 and second electrode 168, 568. If necessary however, a selective or a non-uniform pattern, to the extent desired or practical, could be provided for situations where leakages in particular regions were more significant than in others and a fast response to even a small leak was required, as an example, the leak detection region 360 of FIGS. 2A to 2D. The distribution and pattern of the first electrode 362 and second electrode 368 may be such that a minimal amount of liquid falling on the leak detection region 360 will then have the highest probability of resulting in a conductive bridge therebetween and activating, the leak detection circuitry or device 390. The size of the gap between first electrode 162 and second electrode 168 may also be varied depending upon the sensitivity of the leak detection circuitry or device 190.

In some embodiments, either one of the first insulating material layer, second insulating material layer, or both, may be hydrophilic and electrically non-conductive coverings having high electrical resistance. The hydrophilic coverings may be made of plastic microfibers, natural cellulose fibers, etc.

In some embodiments, either one of the first insulating material layer, second insulating material layer, or both, may be impregnated with an aqueous-soluble salt, increasing the electrical conductivity of the dampened material. The leak detection region may be saturated with an aqueous salt solution, and then dried. Suitable salts for impregnating the hydrophilic layer 105 include sodium chloride and potassium chloride, as an example.

In some embodiments, either one of the first insulating material layer, second insulating material layer, or both, may comprise a moisture responsive visible alert means, whereby a location of liquid leakage on the leak detection region can be quickly determined by visual inspection. This alert means can take any of several forms. As an example, the leak detection region may be treated with a chemical that changes color when exposed to water and/or other conductive liquids. Alternatively, the material from which the leak detection region is made can also be selected such that it naturally stains when contacted by water and/or other conductive liquids.

In some embodiments, either one of the first insulating material layer, second insulating material layer, or both, may further comprise different colored or textured surfaces, whereby surfaces may be differentiated for quick determination and/or aesthetic features.

The first electrode and second electrode may be wires or flat strips and be made of copper, aluminum or other conductive metal. The first electrode and second electrode have sufficient thickness for contact with the inner and second insulating material layer. The first electrode and second electrode may be intimately incorporated into the inner and/or second insulating material layer by adhesive or by other suitable means known to those having ordinary skill in the art, such as by weaving.

In the embodiments, configurable leak detection systems, for liquid cooling systems, bases, and fluid conduits, whereby a heat exchanger is in thermal contact with fluid conduits and/or electric and/or electronic elements, modules, devices and/or systems, transporting heat away therefrom, and then cooling fluid, circulating inside of a cooling loop system incorporating the heat exchanger via fluid conduits, flows over the heat exchanger by at least a pumping unit, removing heat therefrom, as an example, are provided.

In the embodiments, a configurable leak detection system comprising a leak detection device and leak detection covering comprising a leak detection region having a first and second electrode and at least an attachable region is provided. The first and second electrodes are disposed spaced apart by a gap and fixed in firm contact with the covering. The system is attached onto liquid cooling systems, bases, and/or fluid conduits. When liquid is leaked onto the covering, the liquid is absorbed therein, until the dampened region extends over some point on each of the first and second electrodes. An electrical current is conducted, providing a low resistance path therebetween. An impedance change is detected, an alert means is generated, and the leak detection device is reset. More than one configurable leak detection system of different shapes and sizes are fastened to respective liquid cooling systems, bases, and/or fluid conduits via the at least an attachable region, without gathering or wrinkling, and then electrically coupled together.

Small leaks may be detected via adjustment in the gap between the parallel disposed first and second electrodes. Specific regions of leakage may be detected via the sinuous patterns across a plane of the leak detection region and the leak detection circuit or device being configured to determine the exact location of the leakage following leak detection. Also, multiple regions or multiple electric or electronic elements, modules, devices or systems of different sizes and shapes may be leak detectible via a multiple configurable leak detection system comprising the configurable leak detection systems of the embodiments via the configuration ends of the first and second electrodes of a configurable leak detection system of the embodiments being coupled to a configurable leak detection extension system of the embodiments. No alterations, such as cutting, for manual placement and assembly of the configurable leak detection systems of the embodiments is required via the many variations which may be possibly offered and slip-on attachment method of the attachable material.

The presently disclosed inventive concepts are not intended to be limited to the embodiments shown herein, but are to be accorded their full scope consistent with the principles underlying the disclosed concepts herein. Directions and references to an element, such as "up," "down,", "upper," "lower," "horizontal," "vertical," "left," "right," and the like, do not imply absolute relationships, positions, and/or orientations. Terms of an element, such as "first" and "second" are not literal, but, distinguishing terms. As used herein, terms "comprises" or "comprising" encompass the notions of "including" and "having" and specify the presence of elements, operations, and/or groups or combinations thereof and do not imply preclusion of the presence or addition of one or more other elements, operations and/or groups or combinations thereof. Sequence of operations do not imply absoluteness unless specifically so stated. Reference to an element in the singular, such as by use of the article "a" or "an", is not intended to mean "one and only one" unless specifically so stated, but rather "one or more". As used herein, "and/or" means "and" or "or", as well as "and" and "or." As used herein, ranges and subranges mean all ranges including whole and/or fractional values therein and language which defines or modifies ranges and subranges, such as "at least," "greater than," "less than," "no more than," and the like, mean subranges and/or an upper or lower limit. All structural and functional equivalents to the elements of the various embodiments described throughout the disclosure that are known or later come to be known to those of ordinary skill in the relevant art are intended to be encompassed by the features described and claimed herein. Moreover, nothing disclosed herein is intended to be dedicated to the public regardless of whether such disclosure may ultimately explicitly be recited in the claims. No element or concept disclosed herein or hereafter presented shall be construed under the provisions of 35 USC 112f unless the element or concept is expressly recited using the phrase "means for" or "step for".

In view of the many possible embodiments to which the disclosed principles can be applied, we reserve the right to claim any and all combinations of features and acts described herein, including the right to claim all that comes within the scope and spirit of the foregoing description, as well as the combinations recited, literally and equivalently, in the following claims and any claims presented anytime throughout prosecution of this application or any application claiming benefit of or priority from this application.

What is claimed is:

1. A configurable leak detection system, detecting leakage from at least a vessel having pressurized fluid therein, comprising:
   at least a leak detection covering, comprising:
      a leak detection region including:
         a first insulating material layer having a first inner surface and a first outer surface;
         a first electrode, fixedly disposed on the first inner surface; and
         a second electrode, fixedly disposed on the first inner surface, corresponding to the first electrode and spaced apart therefrom by a gap,
         wherein proximal ends of the first and second electrodes form a coupling end of the at least a leak detection covering, and distal ends opposite the proximal ends of the first and second electrodes form a configuration end of the at least a leak detection covering; and
      at least an attachable region including an attachable material, attached to the leak detection region, configured such that the at least a leak detection covering is fastened to the vessel; and
   a leak detection device having electrical circuitry, an input device end, an output device end, and an alert means, the input device end, output device end and alert means are electrically coupled to the electrical circuitry, and the coupling end of the at least a leak detection covering is electrically coupled to the input device end, wherein the leak detection device is configured to detect impedance changes between the first and second electrodes, whereby when impedance changes are detected, an alert is generated.

2. The configurable leak detection system of claim 1, wherein the leak detection region of the at least a leak detection covering further comprises:
   a second insulating material layer opposed to the first insulating material layer, having a second inner surface and a second outer surface,
   wherein the second inner surface is fixed to and in firm contact with the first and second electrodes and the first outer surface, and
   whereby the first and second electrodes are fixedly disposed between the first and second insulating material layers.

3. The configurable leak detection system of claim 2, wherein the attachable material is a stretchable material attached to the leak detection region, configured such that the at least a leak detection covering is slip-on fastened to the vessel.

4. The configurable leak detection system of claim 3, wherein the at least a leak detection covering is turned inside out or outside in to rotate the surfaces of the first insulating material or second insulating material in contact with the vessel.

5. The configurable leak detection system of claim 1, wherein the attachable material is at least one of a button, toggle, zipper, Velcro, or fabric ties or laces, or any combination of the foregoing.

6. The configurable leak detection system of claim 1, wherein the shape of the at least a leak detection covering is a single plane surface shape and a pattern of the corresponding first and second electrodes comprises at least a change of direction.

7. The configurable leak detection system of claim 6, wherein the single plane surface shape of the at least a leak detection covering is T-shaped, and the amount of the at least an attachable region is two or greater.

8. The configurable leak detection system of claim 1, wherein the amount of the at least a leak detection covering is two or greater, and the two or greater at least a leak detection coverings are electrically coupled via configuration and coupling ends thereof, respectively.

9. The configurable leak detection system of claim 8, wherein the shape of the at least a leak detection covering is at least one of a single plane surface shape, multiple plane surface shape, or curved surface shape, or any combination of the foregoing, and a pattern of the corresponding first and second electrodes comprises at least a change of direction or no change of direction.

10. The configurable leak detection system of claim 1, wherein the first insulating material layer is made from hydrophilic and electrically non-conductive material.

11. The configurable leak detection system of claim 2, wherein the second insulating material layer is made from hydrophilic and electrically non-conductive material.

12. The configurable leak detection system of claim 10, wherein the first insulating material layer is made of at least one of a plastic microfiber material, or natural cellulose fiber material, or any combination of the foregoing.

13. The configurable leak detection system of claim 11, wherein the second insulating material layer is made of at least one of a plastic microfiber material, or natural cellulose fiber material, or any combination of the foregoing.

14. The configurable leak detection system of claim 1, wherein the first insulating material layer is impregnated with an aqueous-soluble salt, increasing electrical conductivity thereof when liquid is leaked thereon, facilitating determination of leaking liquid impedance changes.

15. The configurable leak detection system of claim 2, wherein the second insulating material layer is impregnated with an aqueous-soluble salt, increasing electrical conductivity thereof when liquid is leaked thereon, facilitating determination of leaking liquid impedance changes.

16. The configurable leak detection system of claim 1, wherein the first insulating material layer is made of a liquid responsive material, whereby the location of leaking liquid is visibly determinable.

17. The configurable leak detection system of claim 2, wherein the second insulating material layer is made of a liquid responsive material, whereby the location of leaking liquid is visibly determinable.

18. The configurable leak detection system of claim 1, wherein the shape of the first and second electrodes are at least one of wire shaped or flat strip shaped, or any combination of the foregoing.

19. The configurable leak detection system of claim 1, wherein the first and second electrodes are made of at least one of copper, aluminum or other conductive metal, or any combination of the foregoing.

20. The configurable leak detection system of claim 1, wherein the alert means is at least one a visual or audible alert means via corresponding visual or audible devices, or any combination of the foregoing.

* * * * *